(12) United States Patent
Huehn et al.

(10) Patent No.: US 6,866,695 B2
(45) Date of Patent: *Mar. 15, 2005

(54) FILTER ASSEMBLY FOR AIR PURIFIER

(75) Inventors: Barry Huehn, Blacksburg, VA (US); Yani Deros, Phoenix, AZ (US); Stephen Bourque, Peterborough, NH (US)

(73) Assignee: The Holmes Group, Inc., Milford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/770,645

(22) Filed: Feb. 3, 2004

(65) Prior Publication Data

US 2004/0168416 A1 Sep. 2, 2004

Related U.S. Application Data

(63) Continuation of application No. 10/208,254, filed on Jul. 30, 2002, now Pat. No. 6,685,760, which is a continuation of application No. 09/611,513, filed on Jul. 7, 2000, now Pat. No. 6,425,932.
(60) Provisional application No. 60/176,413, filed on Jan. 14, 2000, and provisional application No. 60/142,599, filed on Jul. 7, 1999.

(51) Int. Cl.[7] .............................................. B01D 35/30
(52) U.S. Cl. .......................................... 55/505; 55/508
(58) Field of Search ........................ 55/471, 490, 495, 55/467, 486, 503, 505, 508

(56) References Cited

U.S. PATENT DOCUMENTS

| | | |
|---|---|---|
| 1,462,196 A | 7/1923 | Jordahl |
| 1,521,575 A | 12/1924 | Wittemeier |
| 2,199,632 A | 5/1940 | Keyes |
| 2,214,750 A | 9/1940 | Myers |
| 2,232,065 A | 2/1941 | Hasselwander |
| 2,270,395 A | 1/1942 | Tjernlund |
| 2,808,124 A | 10/1957 | Attwood |
| 2,881,854 A | 4/1959 | Uehre, Jr. |
| 3,286,445 A | 11/1966 | Welch |
| 3,486,311 A | 12/1969 | Allan, Jr. |
| 3,523,858 A | 8/1970 | Schudel |
| 3,577,710 A | 5/1971 | Feldman |
| 3,830,595 A | 8/1974 | Carpenter et al. |
| 3,857,688 A | 12/1974 | Wisnewski |

(List continued on next page.)

FOREIGN PATENT DOCUMENTS

| | | |
|---|---|---|
| DE | 197 00 065 | 5/1998 |
| EP | 0630 7687 | 11/1994 |
| EP | 10311571 | 11/1998 |
| JP | 1-121643 | 3/1989 |
| JP | 1-168315 | 7/1989 |
| WO | WO 98/26232 | 6/1998 |

*Primary Examiner*—Robert A. Hopkins
(74) *Attorney, Agent, or Firm*—Hoffmann & Baron, LLP; Francis E. Marino

(57) ABSTRACT

An air purifying device is provided for removing airborne particles. The device includes a housing including an air inlet and an air outlet. A fan is positioned within the housing for drawing air into the housing through the air inlet and expelling air through the air outlet. A filter assembly is positioned within the housing between the air inlet and the fan. The filter assembly includes a frame and a filter element mounted to the frame. The device also includes a hanger and an elongate hanger support that removably extends within the hanger. Either the hanger or the elongate hanger support is coupled to the frame while the other is coupled to the housing. The hanger can include a channel or a pair of opposed legs configured to form a gap.

6 Claims, 31 Drawing Sheets

U.S. PATENT DOCUMENTS

| | | |
|---|---|---|
| 3,928,008 A | 12/1975 | Petersen |
| 4,251,237 A | 2/1981 | Smith |
| 4,378,983 A | 4/1983 | Martin |
| 4,425,145 A | 1/1984 | Reese |
| 4,436,538 A | 3/1984 | Tomita et al. |
| 4,450,682 A | 5/1984 | Sato et al. |
| 4,487,606 A | 12/1984 | Leviton et al. |
| 4,521,234 A | 6/1985 | Peebles, Jr. et al. |
| 4,552,574 A | 11/1985 | Hotta |
| 4,604,110 A | 8/1986 | Frazier |
| 4,629,482 A | 12/1986 | Davis |
| 4,634,458 A | 1/1987 | Craig |
| 4,737,173 A | 4/1988 | Kudirka et al. |
| 4,749,390 A | 6/1988 | Burnett et al. |
| 4,778,496 A | 10/1988 | Conrad |
| 4,790,863 A | 12/1988 | Nobiriki et al. |
| 4,802,900 A | 2/1989 | Ball et al. |
| 5,047,348 A | 9/1991 | Stinson |
| 5,078,764 A | 1/1992 | Lutterbach et al. |
| 5,080,699 A | 1/1992 | Ho et al. |
| 5,102,435 A | 4/1992 | Rau et al. |
| 5,131,932 A | 7/1992 | Glucksman |
| RE34,055 E | 9/1992 | Tassicker |
| 5,230,723 A | 7/1993 | Travis et al. |
| 5,259,854 A | 11/1993 | Newman |
| 5,266,090 A | 11/1993 | Burnett |
| 5,288,298 A | 2/1994 | Aston |
| 5,290,330 A | 3/1994 | Tepper et al. |
| 5,298,045 A | 3/1994 | Whitson et al. |
| 5,322,536 A | 6/1994 | Straub |
| 5,379,609 A | 1/1995 | Matsumato et al. |
| 5,512,086 A | 4/1996 | Glucksman |
| 5,733,350 A | 3/1998 | Muller et al. |
| 5,762,665 A | 6/1998 | Abrahamian et al. |
| 5,766,286 A | 6/1998 | Flaherty et al. |
| 5,769,915 A | 6/1998 | Dehn et al. |
| 5,833,727 A | 11/1998 | Skarsten |
| 5,893,939 A | 4/1999 | Rakocy et al. |
| 5,935,282 A | 8/1999 | Lin |
| 5,980,600 A | 11/1999 | Stopyra et al. |
| 6,004,367 A | 12/1999 | Stopyra et al. |
| 6,478,838 B2 | 11/2002 | McSweeney et al. |

FILTER ASSEMBLY FOR AIR PURIFIER

BACKGROUND OF THE INVENTION

This application is a continuation of U.S. application Ser. No. 10/208,254 filed on Jul. 30, 2002 which issued as U.S. Pat. No. 6,685,760 on Feb. 3, 2004, which is a continuation of U.S. application Ser. No. 09/611,513 filed on Jul. 7, 2000 which issued as U.S. Pat. No. 6,425,932 on Jul. 30, 2002 and claims priority to U.S. Provisional Applications 60/142,599 filed on Jul. 7, 1999 and 60/176,413 filed on Jan. 14, 2000. The entire disclosure of each of the aforementioned patent applications are incorporated herein by reference.

FIELD OF THE INVENTION

The field of the invention relates to air purifiers, particularly to portable air purifiers including HEPA filters.

BRIEF DESCRIPTION OF THE PRIOR ART

Portable air purifiers for removing airborne particles are used in many homes and offices. Such purifiers often include a fine particle high efficiency particulate air (HEPA) filter. In addition to a HEPA filter, some purifiers include a carbon filter to remove odors. The carbon may be incorporated within a fibrous matrix. A filter for trapping relatively large particles may also be found in portable air purifiers. In operation, one or more fans cause air to be drawn through the filter(s) and emitted through an outlet.

HEPA filters have gained increasing acceptance for use in purifiers directed to consumers as they remove 99.97% of particles having a size equal to or greater than 0.3 microns. In order to take full advantage of a HEPA filter or any other type of filter used in an air purifier, it is important to ensure that substantially all of the air emitted by the air purifier has indeed first passed through the filter(s) provided in the purifier. Where a filter includes both a HEPA component and filter component, the lifespan of the filter is generally dependent upon the carbon component. This is because the trapping capacity of the carbon component is generally exhausted prior to that of the HEPA component.

As the filter(s) employed in air purifiers require replacement when spent, the ability to easily remove and replace the filter(s) is important. A replaced filter must be properly installed if it is to function properly. Disposable filter assemblies have accordingly been designed to facilitate user convenience.

Currently portable air purifiers are manufactured in various sizes with different capacities to suit a consumer's particular needs. The larger capacity air purifiers generally require larger sized filters. This generally requires retailers to stock a plurality of different size filter elements to satisfy the demands of all consumers. Replacement HEPA filter elements are traditionally bulky and expensive inventory for retailers to maintain. The retailer must stock the replacement filters for every air purifier that is sold, but the filters generally do not need replacement very frequently. The retailers that carry air purifiers are required out of necessity to offer a line of different size units that are expensive to purchase, do not turn over very often, and take up a lot of shelf space. In addition, to exacerbate the problem it has been found that by the time the consumer needs to replace the filter element, the inventory is old and looks beat up.

A number of patents have issued which disclose air purifiers including HEPA filters, carbon filters, and/or other filters. U.S. Pat. Nos. 3,928,008; 4,378,983; 4,521,234; 4,629,482; 4,737,173; 4,778,496; 5,078,764; 5,102,435; 5,131,932; 5,230,723; 5,259,854; 5,290,330; 5,512,086; and 5,893,939 disclose air purifiers of various constructions. The disclosure of the U.S. Pat. No. 5,893,939 is incorporated herein by reference.

SUMMARY OF THE INVENTION

An air purifying device is provided for removing airborne particles. The device includes a housing including an air inlet and an air outlet. A fan is positioned within the housing for drawing air into the housing through the air inlet and expelling air through the air outlet. A filter assembly is positioned within the housing between the air inlet and the fan. The filter assembly includes a frame and a filter element mounted to the frame. The device also includes a hanger and an elongate hanger support that removably extends within the hanger. Either the hanger or the elongate hanger support is coupled to the frame while the other is coupled to the housing.

In a first preferred embodiment, the hanger includes a channel. Preferably the hanger is coupled to an exterior surface of the frame. The hanger is preferably either coupled to a top surface of the frame or alternatively, where the frame includes first and second side surfaces, the hanger is coupled to either the first side surface or the second side surface. The hanger preferably includes at least one pair of converging walls bounding the channel. Preferably the device also includes a second hanger having a channel and a second elongate hanger support that removably extends within the second hanger. Either the second hanger or the second elongate hanger support is coupled to the frame while the other is coupled to the housing.

In a second preferred embodiment, the hanger includes a pair of opposed legs configured to form a gap. The hanger is preferably coupled to an exterior surface of the frame. Preferably the housing includes a door configured to engage the filter assembly. The device also preferably includes a second hanger having a pair of opposed legs configured to form a gap and a second elongate hanger support that removably extends within the second hanger. Either the second hanger or the second elongate hanger support is coupled to the frame while the other is coupled to the housing. Preferably the elongate member includes at least one rib extending within the gap. Preferably the housing includes a wall element attached to the rib.

A filter assembly for removable mounting to an air purifying device is also provided in accordance with the invention. The filter assembly includes a frame, a filter element mounted to the frame, and a hanger coupled to the frame. The hanger removably receives a hanger support mounted to an air purifying device. The frame preferably includes a top wall, a bottom wall, and first and second opposing side walls connecting the top and bottom walls with the filter element being positioned within the walls and the hanger being positioned outside the walls. Preferably, the hanger is either coupled to the top wall or alternatively, to either the first side wall or the second side wall. Preferably the frame is generally rectangular and the channel is generally rectangular in cross section. The filter assembly preferably includes a second filter element. Most preferably, the filter element is a HEPA filter and the second filter element is a removably attached carbon filter.

In an alternative embodiment of the filter assembly, the filter assembly includes a frame, a filter element mounted to the frame, and an elongate hanger support coupled to the frame. The elongate hanger support removably extends within a hanger mounted to an air purfying device. The frame preferably includes a top wall, a bottom wall, and first and second opposing side walls connecting the top and bottom walls with the filter element being positioned within the walls and the hanger support being positioned outside the walls. Preferably, the hanger support is either coupled to the top wall or alternatively, to either the first side wall or the second side wall.

DETAILED DESCRIPTION OF THE PREFERRED EMBODIMENTS

Figure 1:
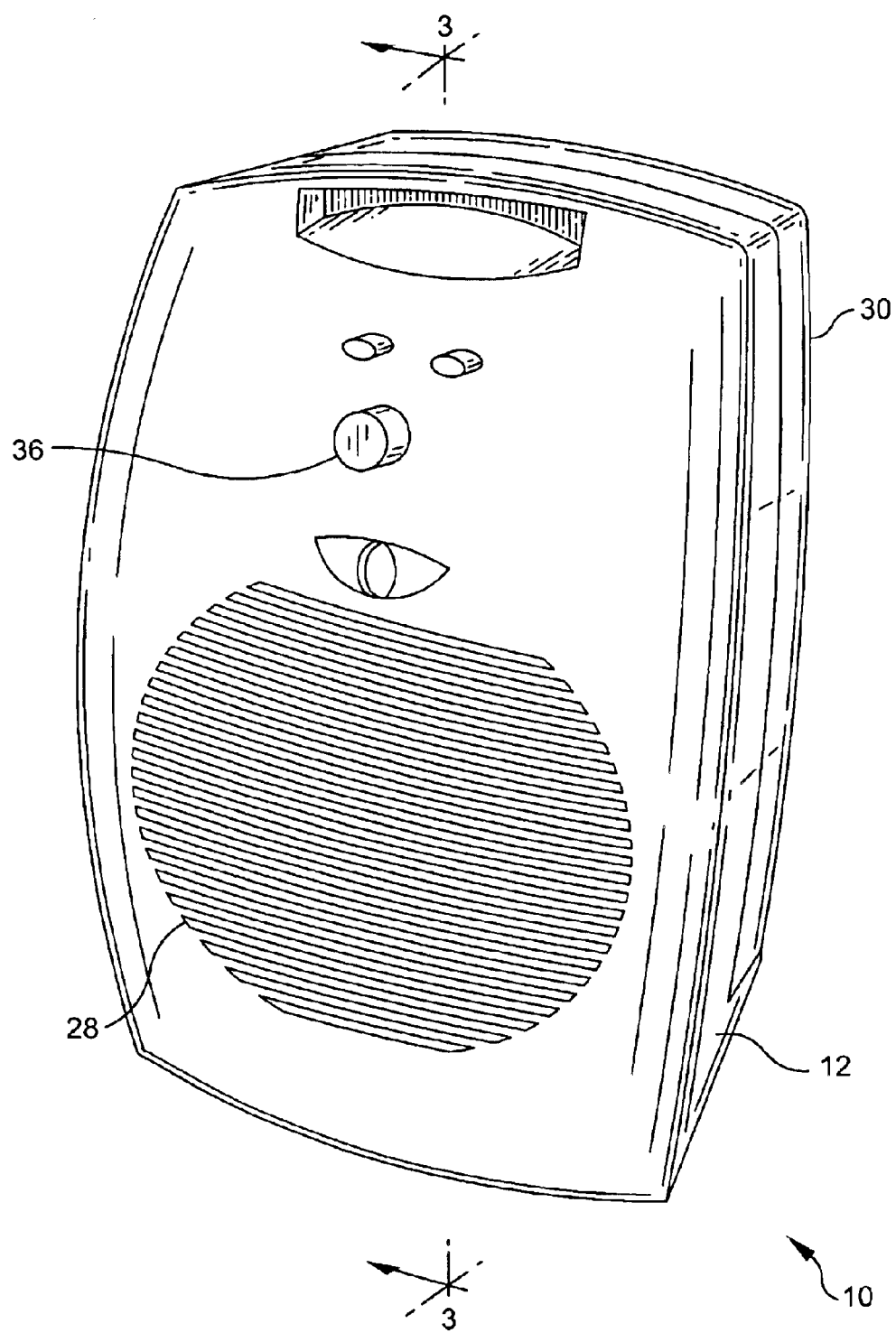
FIG. 1 is a front perspective view of a preferred embodiment of the present invention.
Figure 2:
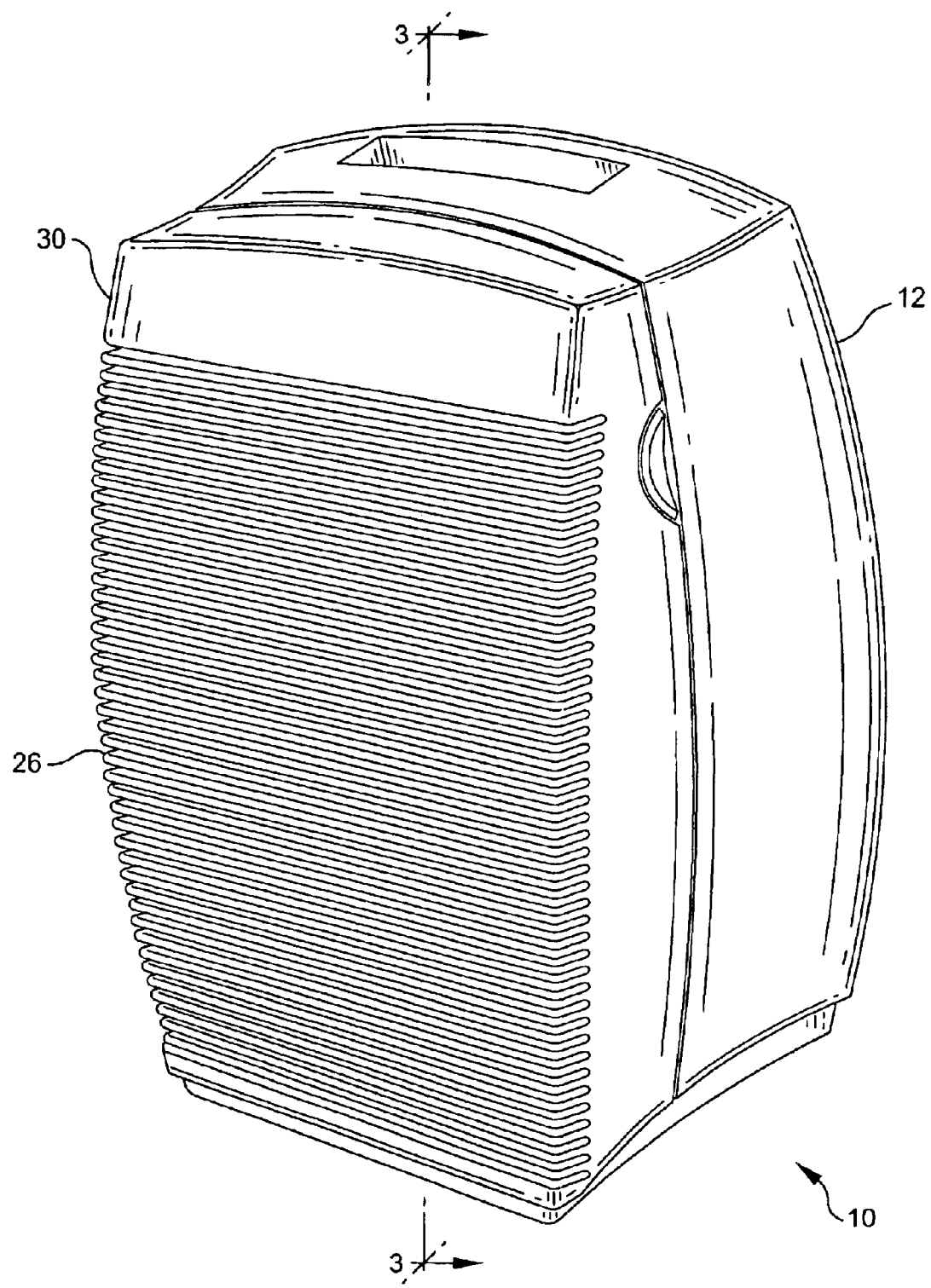
FIG. 2 is a rear perspective view of the preferred embodiment of the present invention shown in FIG. 1.
Figure 3:
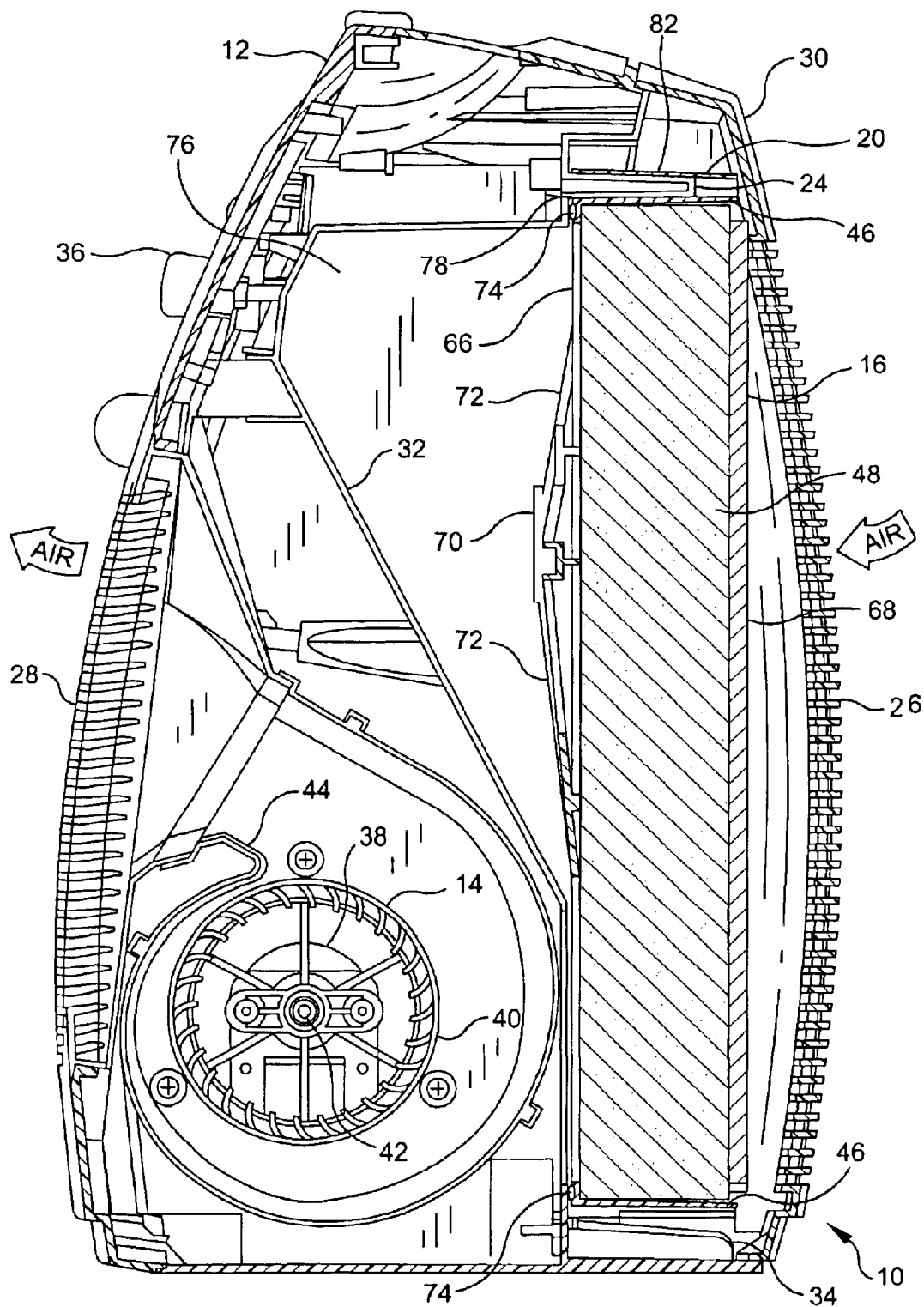
FIG. 3 is a cross-sectional view taken along line 3—3 as shown in FIGS. 1 and 2 of the preferred embodiment of the present invention shown therein.
Figure 4:
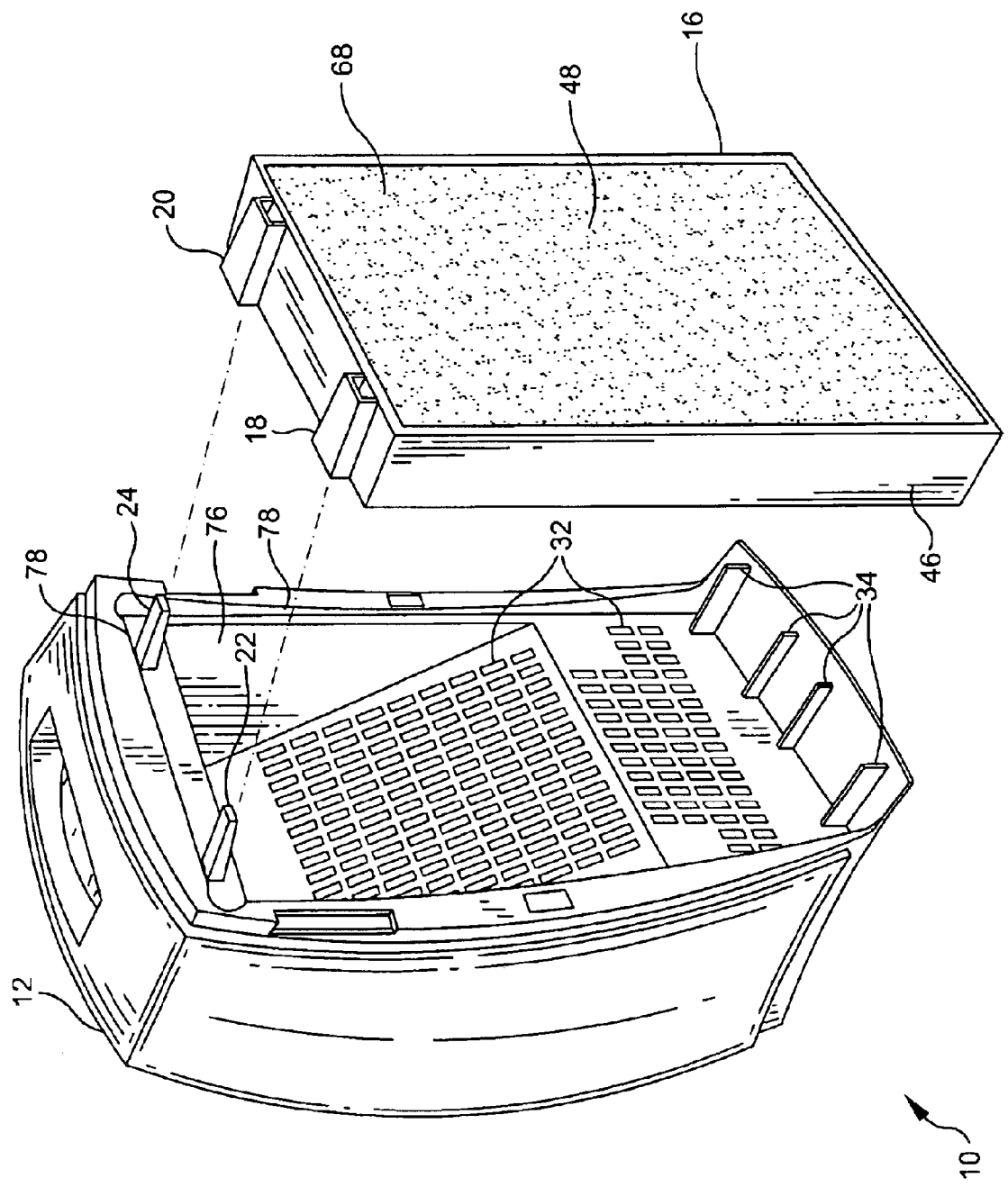
FIG. 4 is a partially exploded rear view of the preferred embodiment of the present invention shown in FIG. 1 with the filter assembly cover removed.

Initially referring to FIGS. 1 through 4, an air purifying device 10 in accordance with the present invention is depicted. The device includes a housing 12, a fan 14, a filter assembly 16, first and second hangers 18, 20, and first and second elongate hanger 22, 24 supports as shown in FIG. 4.

Referring now to FIG. 3, the housing 12 includes an air inlet 26 and an air outlet 28. Preferably both the air inlet 26 and an air outlet 28 are configured as a grill with a plurality of slot-like openings or the like formed in the exterior walls of the housing 12. The housing 12 preferably includes a filter assembly cover 30 that is removable and has the air inlet 26 formed therein as shown in FIG. 2. As shown in FIGS. 3 and 4, the housing 12 preferably includes an inner grate 32 having a plurality of slot-like openings positioned between the filter assembly 16 and the fan 14. The particular shapes of the openings is not deemed critical so long as they permit satisfactory throughput of air. The lower portion of the housing 12 below the filter assembly 16 preferably includes a plurality of stiffening ribs 34 to strengthen the housing 12 between the air inlet 26 and the inner grate 32. The housing 12 is preferably configured to accommodate a control knob 36 for adjusting the fan speed to control the flow of air. The housing 12 is preferably made from a light weight durable material such as a rigid plastic.

The fan 14 includes an electric motor 38, which is preferably operable on alternating current, and a fan blade 40 that is coupled to the electric motor 38 by a drive shaft 42. The fan 14 is positioned within the housing 12 so that air is drawn through the air inlet 26 and is expelled through the air outlet 28 as shown in FIG. 3. Preferably the fan 14 is a forward curved centrifugal blower which draws air in axially to the center of the fan blade 40 and then expels the air out radially into a scroll 44. The scroll 44 is preferably attached to the air outlet 28 of the housing 12 to accommodate the resulting airflow.

Figure 5:
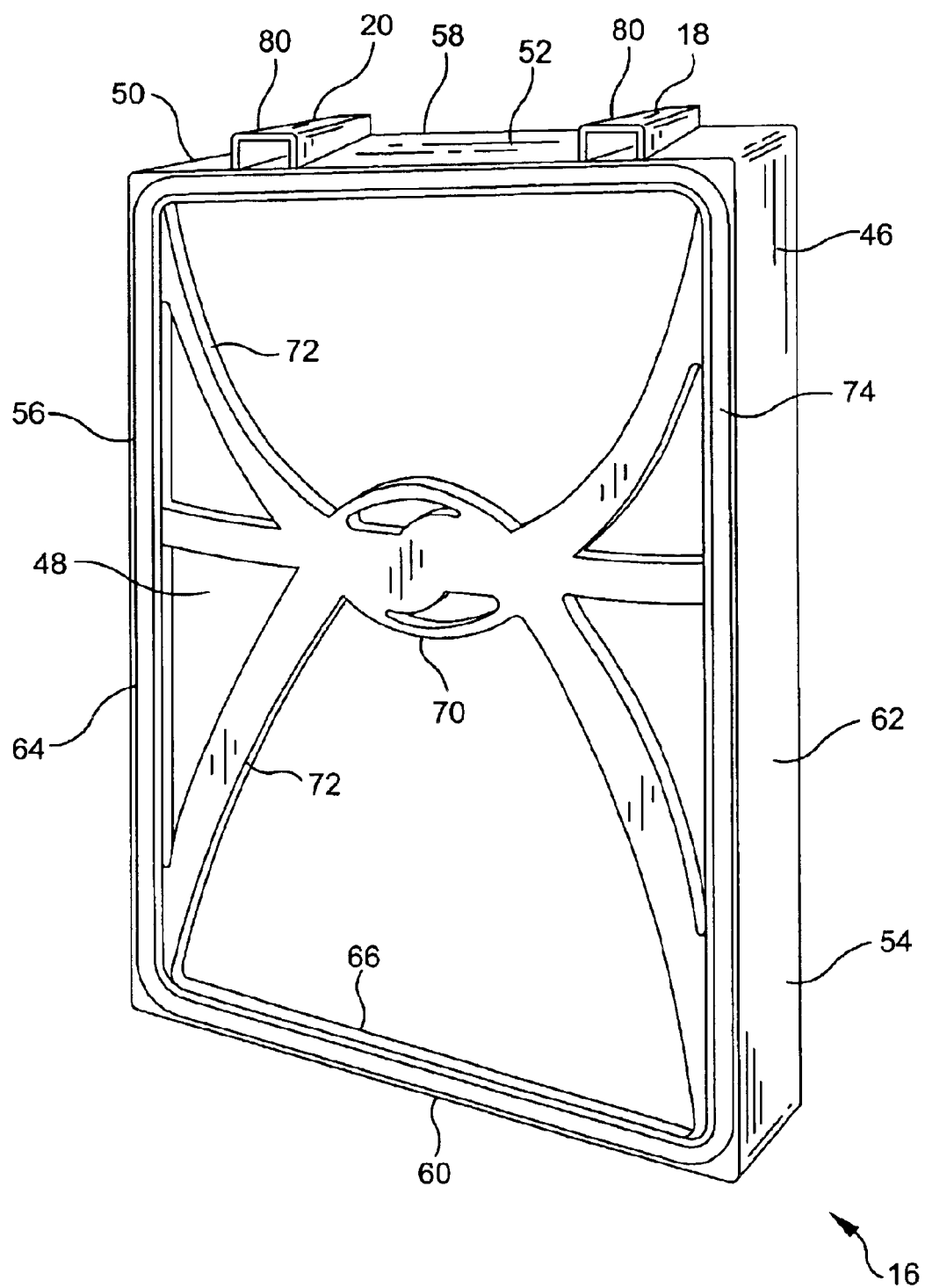
FIG. 5 is a rear perspective view of the filter assembly of the preferred embodiment of the present invention shown in FIG. 1.

Referring again to FIG. 3 the filter assembly 16 is positioned within the housing 12 between the air inlet 26 and the fan 14. The filter assembly 16 includes a frame 46 and a filter element 48 mounted to the frame 46 as shown in FIGS. 3 and 5. Preferably the filter element 48 is a high efficiency particulate air (HEPA) filter. The frame 46 has an exterior surface 50 including top 52 and first and second side surfaces 54, 56. The frame 46 preferably includes a top wall 58, a bottom wall 60, and first and second opposing side walls 62, 64 connecting the top and bottom walls 58, 60 with the filter element 48 being positioned within the walls as shown in FIG. 5. The frame 46 is generally rectangular, but could include other shapes and sizes. The frame 46 includes an outlet end 66 and an inlet end 68. Preferably a support 70 is coupled to the outlet end 66 of the frame 46. The support 70 includes a plurality of strap-like elements 72 which extend across the frame 46 to maintain the filter element 48 against the air pressure created by the fan 14 as air is drawn through the filter assembly 16. A seal 74 is preferably mounted to the outlet end 66 of the frame 46. As shown in FIGS. 3 and 4, preferably the housing 12 is formed with a cavity 76 defined by a perimeter 78 that is adapted to bear against the seal 74 when the filter assembly 16 and filter assembly cover 30 are installed. A substantially air-tight seal is formed by the engagement of the frame seal 74 and housing 12. Operation of the blower tends to draw the frame 46 towards the housing 12, thereby enhancing the seal.

Figure 7:
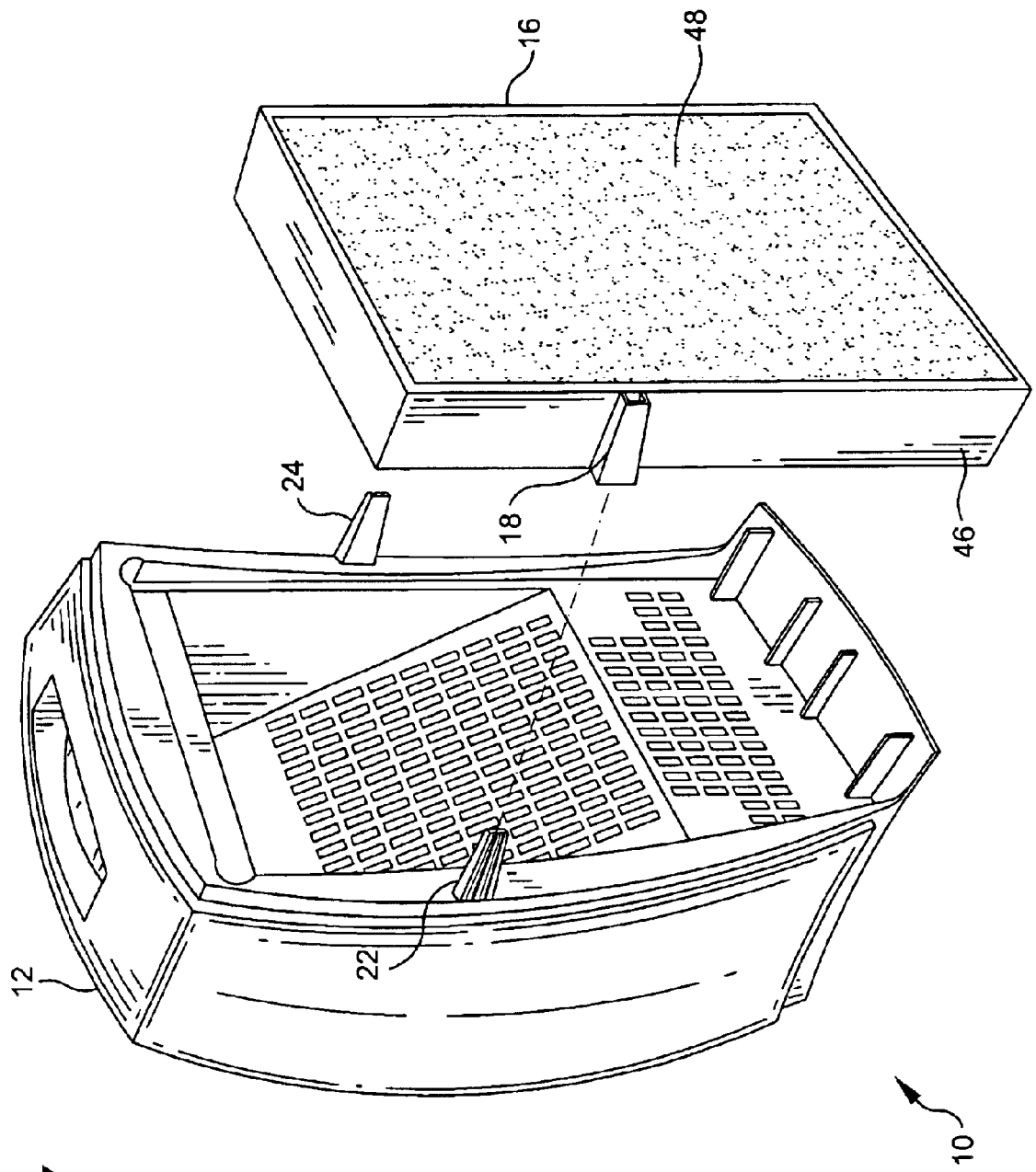
FIG. 7 is a partially exploded rear perspective view of an alternative preferred embodiment of the present invention showing the hanger and elongate hanger supports located at the side of the filter assembly.

Referring now to FIGS. 4 and 5, the first and second hangers 18, 20 are coupled to the frame 46 of the filter assembly 16. Each of the hangers 18, 20 preferably includes a channel 80. Preferably the hangers 18, 20 are coupled to an exterior surface 50 of the frame 46 as shown in FIGS. 5 and 7. In a preferred embodiment of the invention, the hangers 18, 20 are coupled to the top surface 52 of the frame 46 as shown in FIGS. 4 and 5. In an alternative embodiment of the invention, the first and second hangers 18, 20 are respectively coupled to the first and second side surfaces 54, 56 of the frame 46 as shown in FIG. 7 (second hanger not shown). Preferably each hanger 18, 20 includes at least one pair of converging walls 82 bounding the channel 80 as shown in FIG. 3. In an alternative embodiment, each of the hangers 18, 20 preferably includes two pairs of converging walls. The converging walls 82 serve to ensure that the filter assembly is installed correctly. In another embodiment of the invention, the channels 80 are plugged at their end adjacent to the inlet end 68 of the frame 46 to prevent the filter assembly 16 from being installed backwards. Although the cross section of the channels 80 as shown in FIGS. 4 and 5 is generally rectangular, the cross section can also be circular, ovular, triangular or polygonal provided that the first and second elongate hanger supports 22, 24 as described below are configured accordingly. In addition, although it is preferable to practice the present invention using first and second hangers 18, 20, the present invention can be practiced with only one hanger.

Referring now to FIGS. 4 and 7, the first and second elongate hanger supports 22, 24 are mounted to the housing 12. The first and second elongate hanger supports 22, 24 are respectively configured to be removably extended within the first and second hangers 18, 20. While the filter assembly 16 should be easily installed or removed, a relatively snug fit between the hangers 18, 20 and hanger supports 22, 24 is preferred. Such a fit will provide for frictional retention of the filter assembly 16. Detents may optionally be provided on the hangers 18, 20 and/or hanger supports 22, 24 for retention purposes. The hanger supports 22, 24 provide support for the filter assembly 16 so that it can be hung between the air inlet 26 and the fan 14. The hanger supports 22, 24 preferably, but not necessarily, provide the sole means of supporting the filter assembly 16. As noted above with respect to the first and second hangers 18, 20, the present invention can be practiced with only one hanger support.

Figure 6:
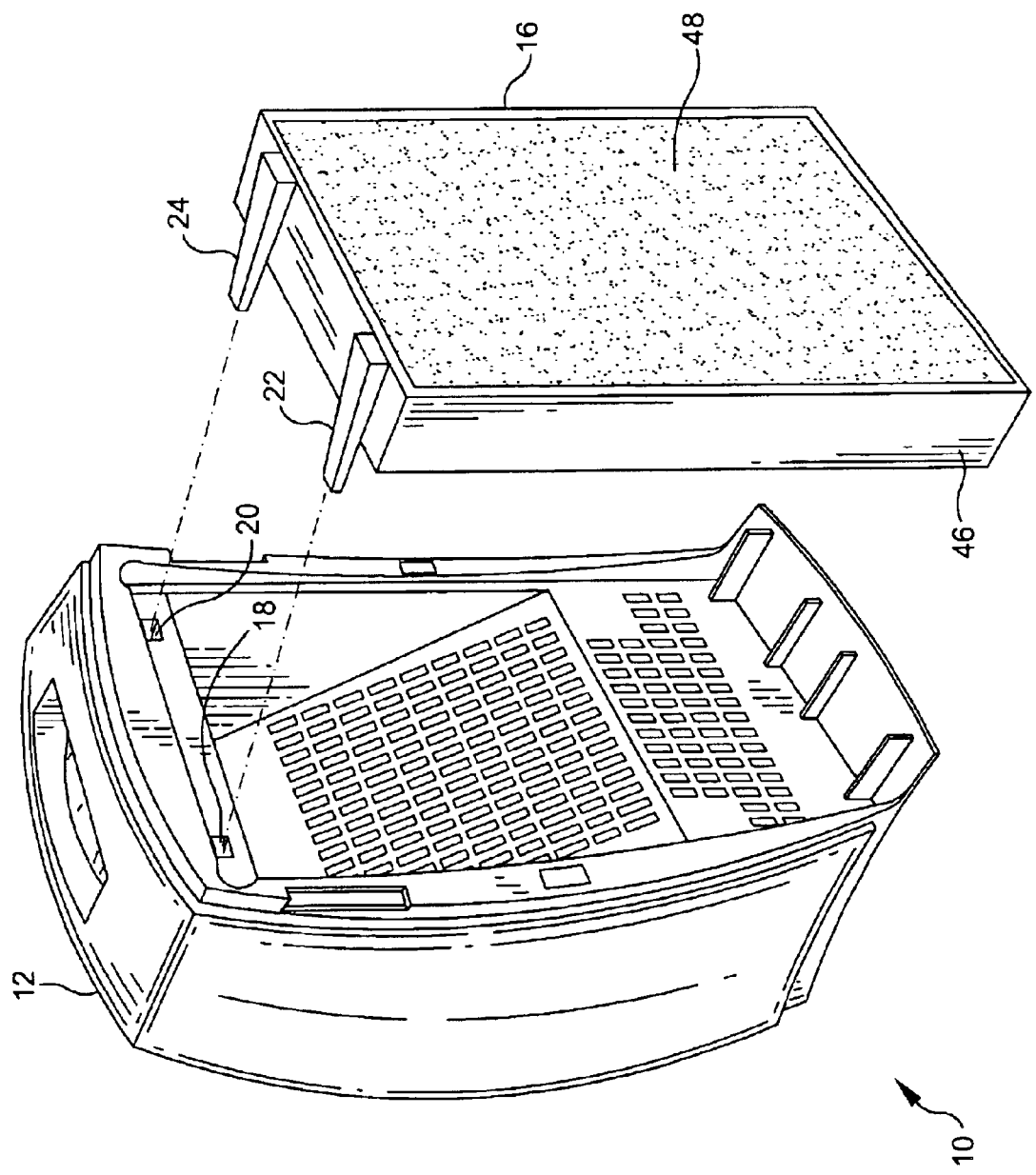
FIG. 6 is a partially exploded rear perspective view of an alternative embodiment of the present invention.

Referring now to FIG. 6, an alternative embodiment of the invention is shown where the first and second hangers 18, 20 are coupled to the housing 12 and the first and second elongate hanger supports 22, 24 are coupled the frame 40 of the filter assembly 16. The alternative embodiment is similar to the embodiment that is shown in FIGS. 4 and 5 as the hanger supports 22, 24 are coupled to the top surface 52 of the frame 46. The alternative embodiment can be similarly configured to that as shown in FIG. 7, where the hanger supports 22, 24 are coupled to the side surfaces 54, 56 of the frame 46 and the hangers 18, 20 are coupled to the housing 12.

In another alternative embodiment of the invention (not shown) that includes first and second hangers 18, 20 and first and second elongate hanger supports 22, 24, one of the hangers is coupled to the frame 46 of the filter assembly 16 while the other is coupled to the housing 12. The hanger supports 22, 24 are similarly coupled to cooperate with the hangers 18, 20 for supporting the filter assembly 16. This configuration is beneficial in that the arrangement 18, 20 of the hangers and hanger supports 22, 24 ensures that the filter assembly 16 is not installed backwards.

In operation, the control knob 36 on the housing 12 is turned by the user to select a desired fan speed. Rotation of the fan blade 40 causes air to be drawn into the air inlet 26 through the filter assembly 16. The filtered air then moves through the inner grate 32 and enters the fan 14. The fan 14 expels the air into the scroll 44 which then exits through the air outlet 28. Since the filter assembly 16 restricts the airflow, considerable suction is created across the outlet end 66 of the filter assembly 16 causing the filter assembly 16 to be drawn towards the perimeter 78 of the cavity 76. This enhances the engagement of the seal 74 and the perimeter 78 of the housing cavity 76 to ensure that unfiltered air does not bypass the filter assembly 16 prior to entering the fan 14.

The filter assembly 16 of the air purifier 10 is easily replaced. The filter assembly cover 30 is first removed and then the spent filter assembly 16 is taken off the elongate hanger supports 22, 24. The new filter assembly 16 is installed by aligning the hangers thereof with the hanger supports and sliding the new filter assembly onto the hanger supports 22, 24. The hangers 18, 20 and hanger supports 22, 24 are advantageous because a user is assured that the correct replacement filter assembly 16 is being used when it is properly mounted to the air purifier 10. The converging walls 82 of the hangers 18, 20 are beneficial to the user in that they prevent the user from installing the filter assembly 16 backwards.

The present invention can also be used in a family of air purifiers 110 that use a modular filter assembly 116. Referring now to FIGS. 10 through 24, a family of air purifiers 110 that use a modular filter assembly 116 in accordance with the present invention are shown. As discussed above with respect to the embodiment shown in FIGS. 1 through 5, the air purifying devices 110 generally include a housing 112, a fan 114, at least one filter assembly 116, at least one set of first and second hangers 118, 120, and at least one set of first and second elongate hanger supports 122, 124. The housings 112 also include air inlets 126 and air outlets 128 as described above.

Figure 11:
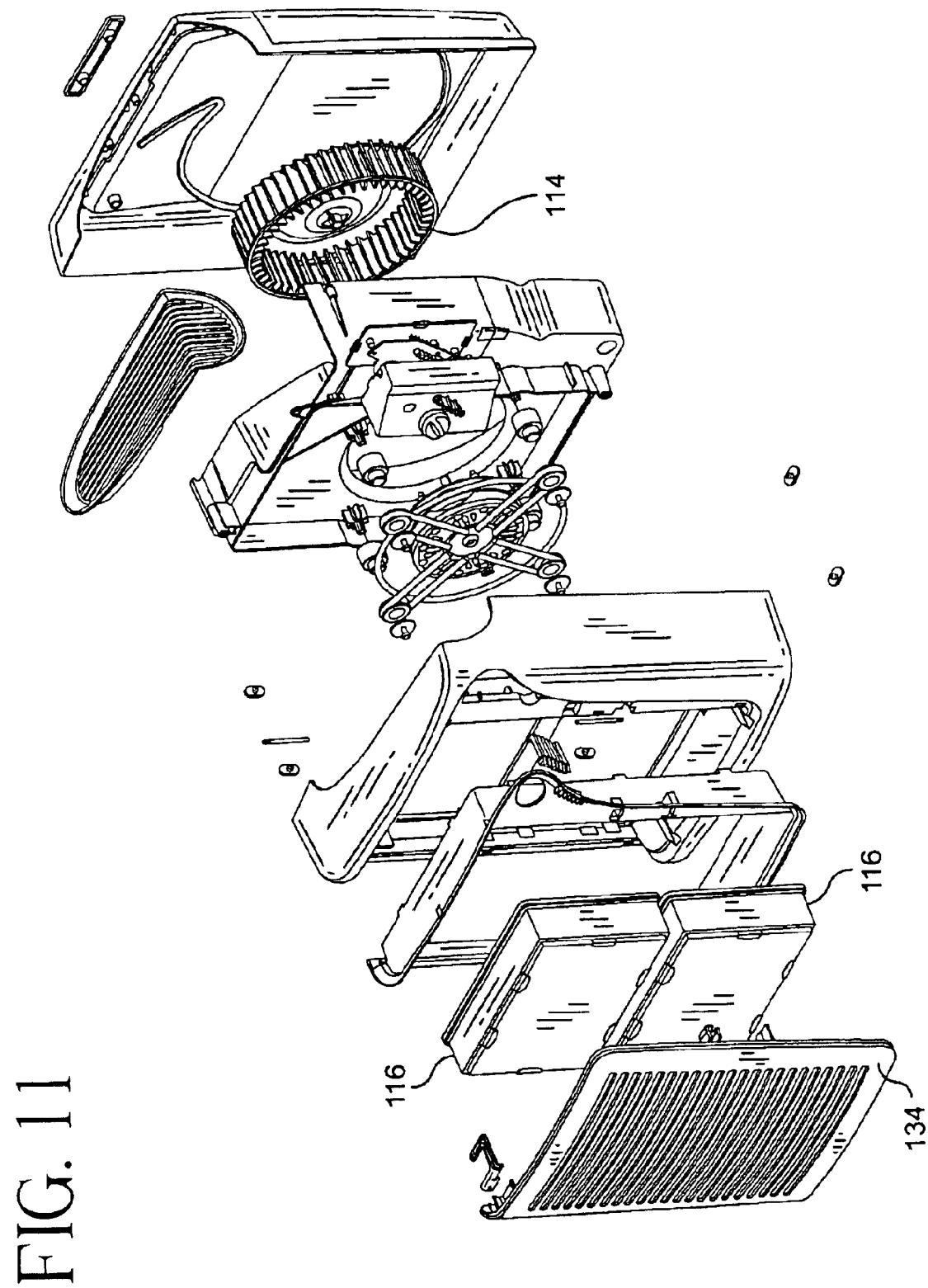
FIG. 11 is an exploded perspective view of the air purifier shown in FIG. 10.
Figure 12:
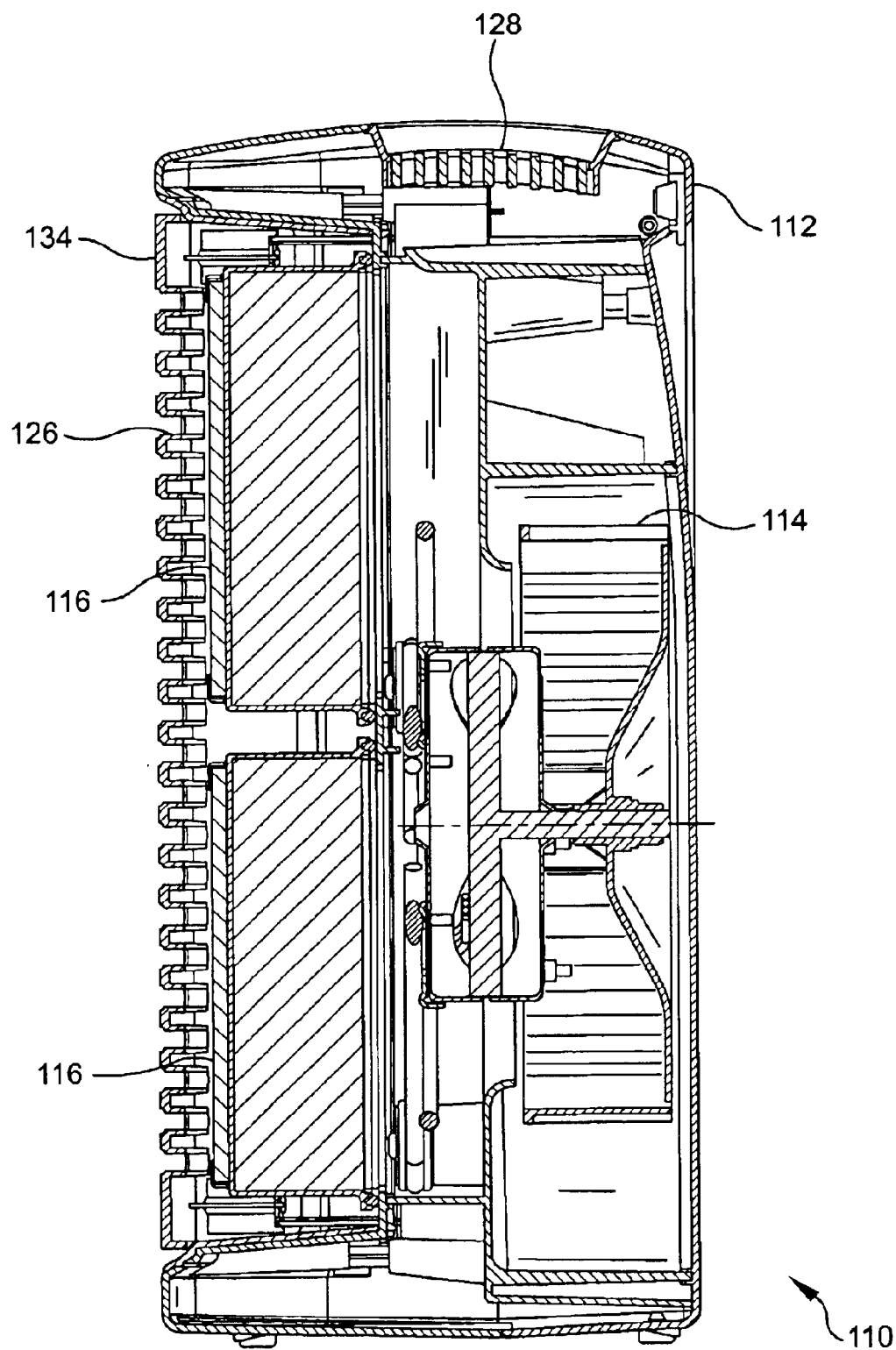
FIG. 12 is a cross-sectional view taken along line 12—12 as shown in FIG. 10.
Figure 13:
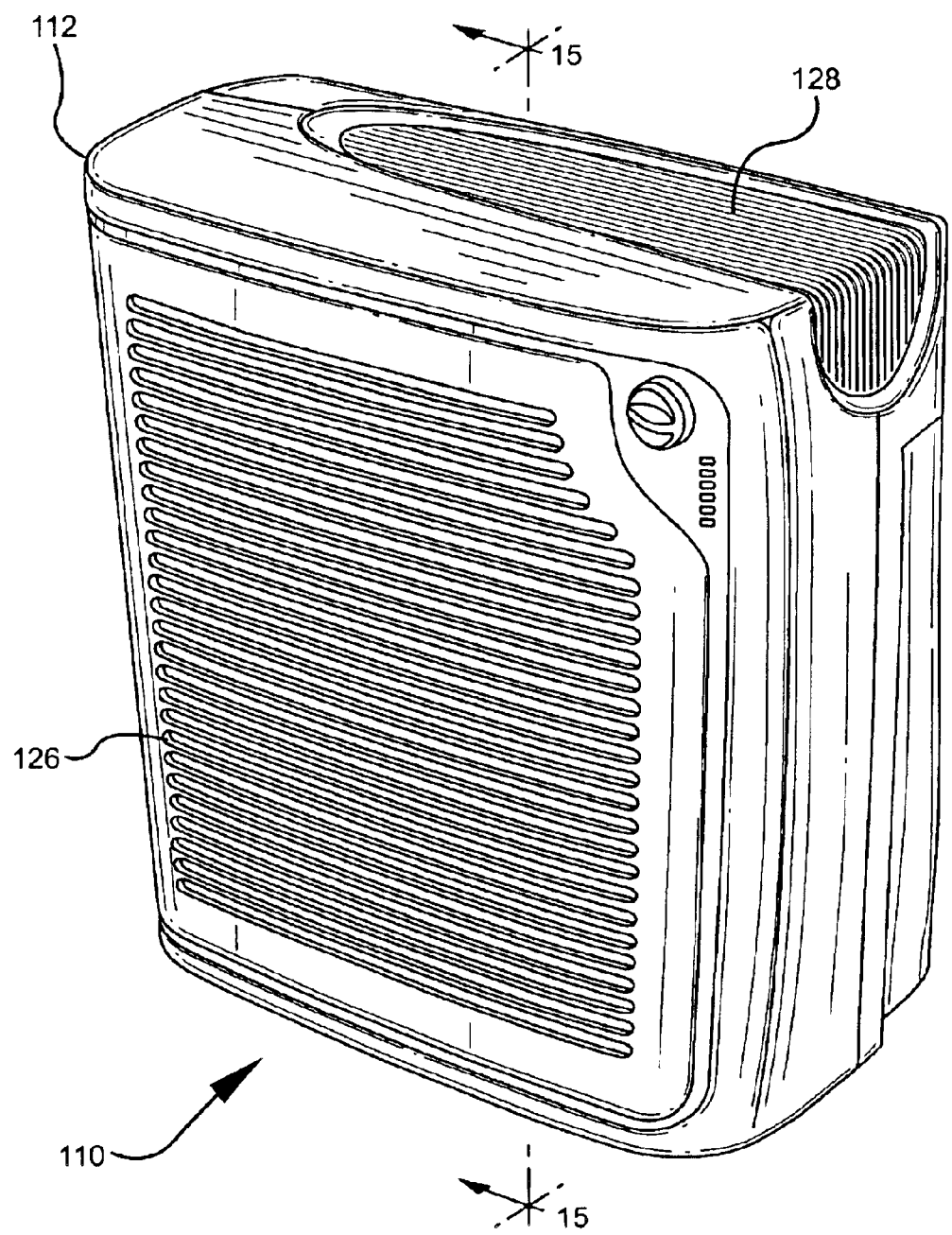
FIG. 13 is a front perspective view of a second member of a family of air purifiers in accordance with the present invention.
Figure 14:
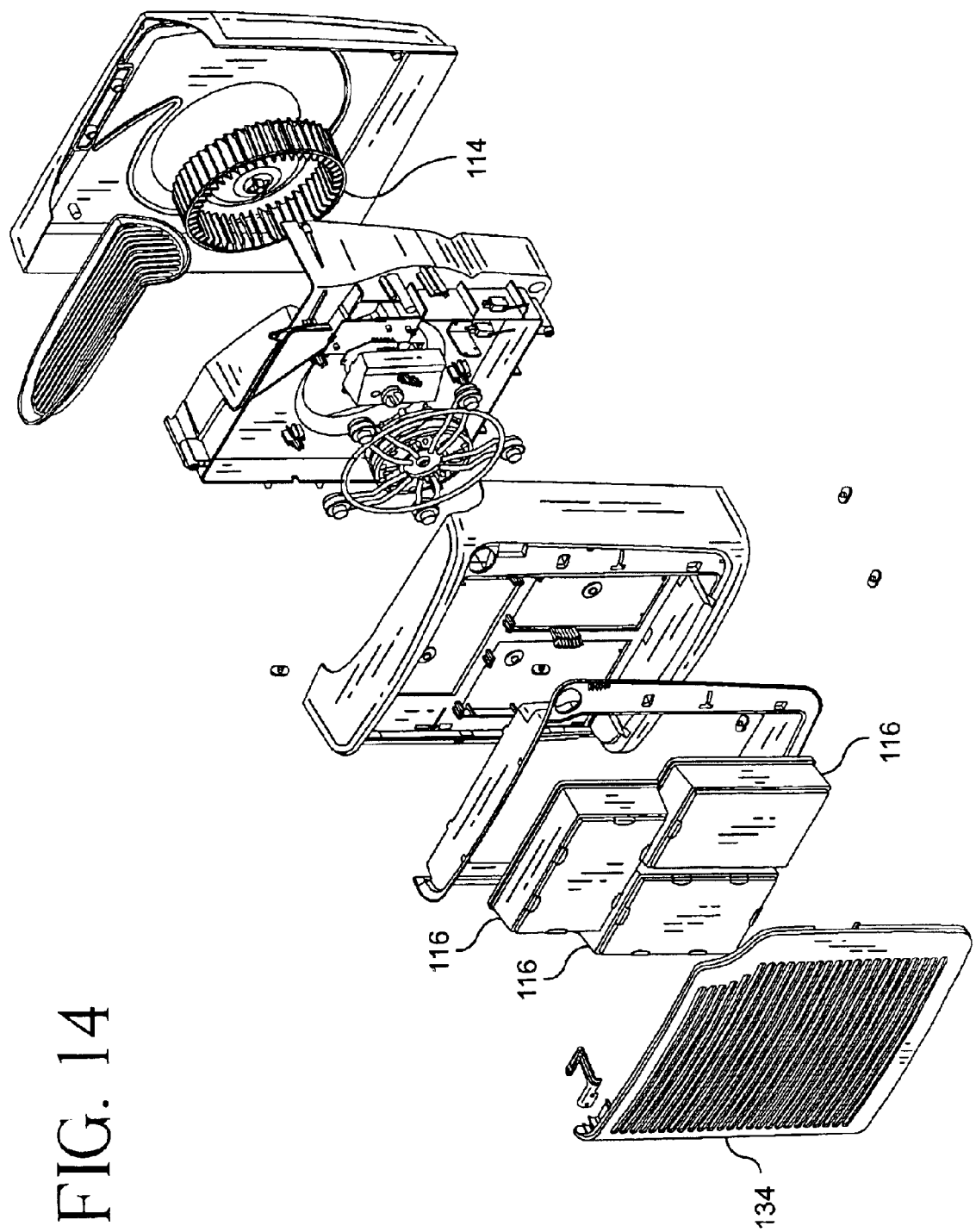
FIG. 14 is an exploded perspective view of the air purifier shown in FIG. 13.
Figure 17:
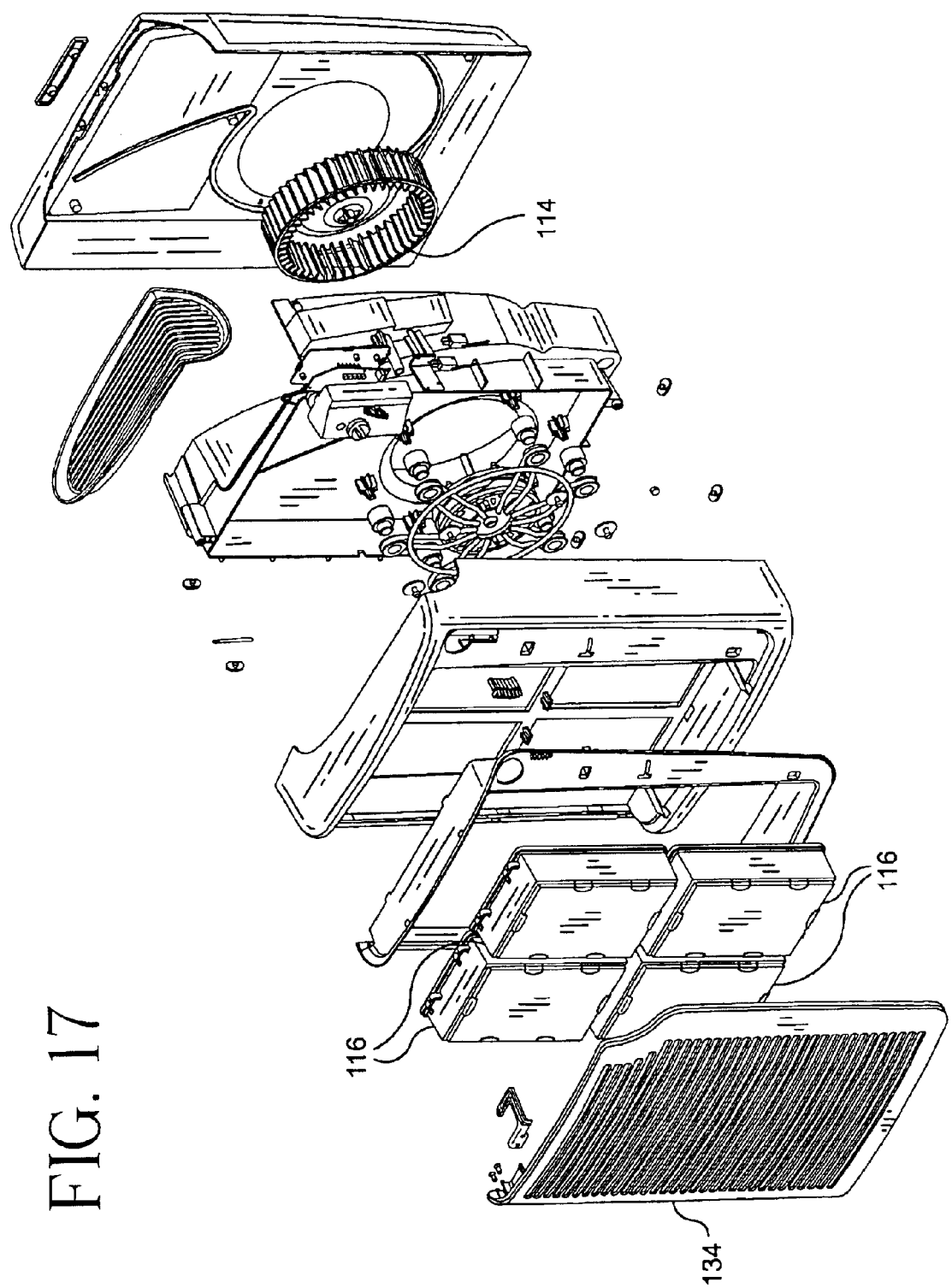
FIG. 17 is an exploded perspective view of the air purifier shown in FIG. 16.
Figure 18:
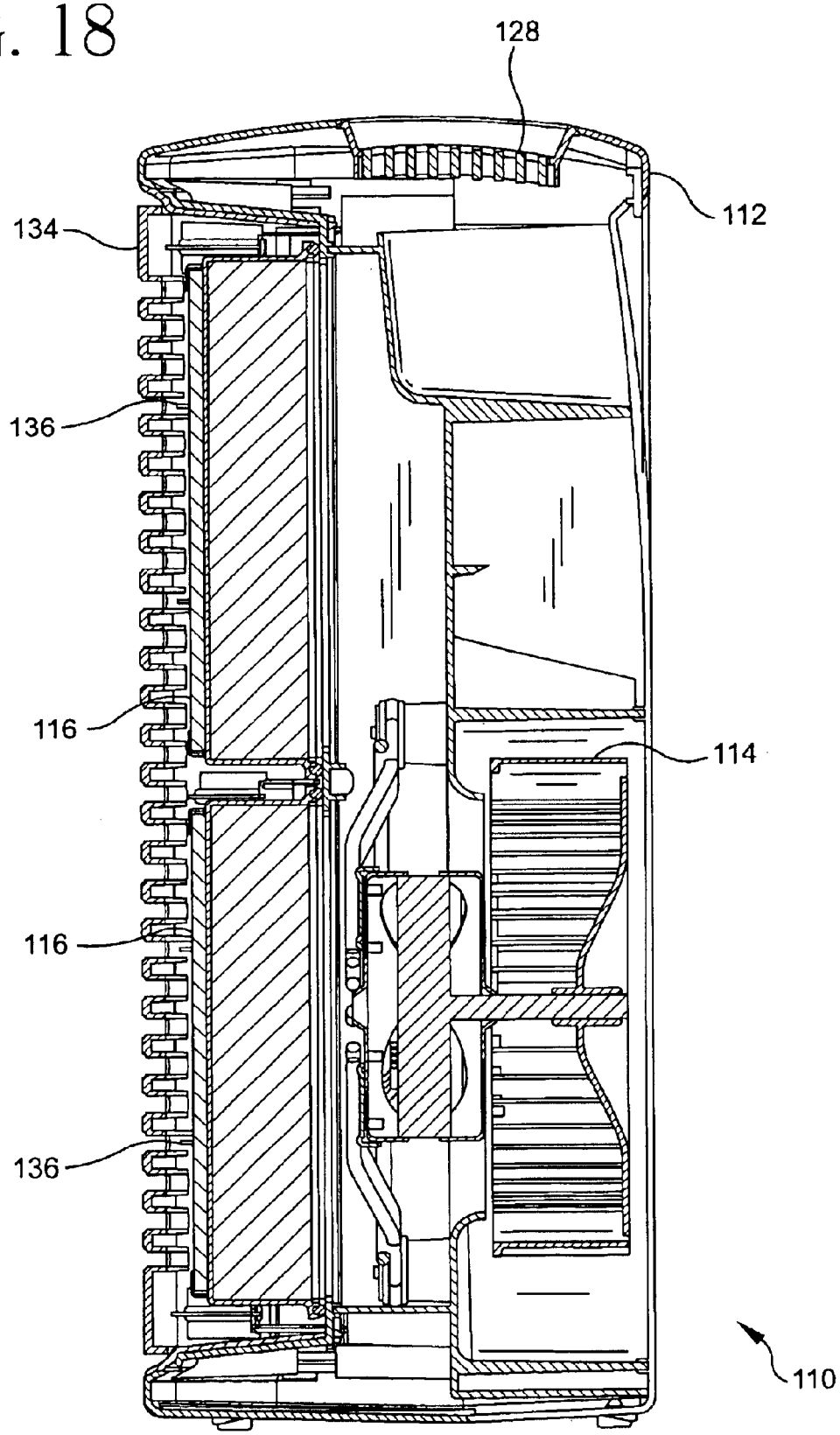
FIG. 18 is a cross-sectional view taken along line 18—18 as shown in FIG. 16.
Figure 19:
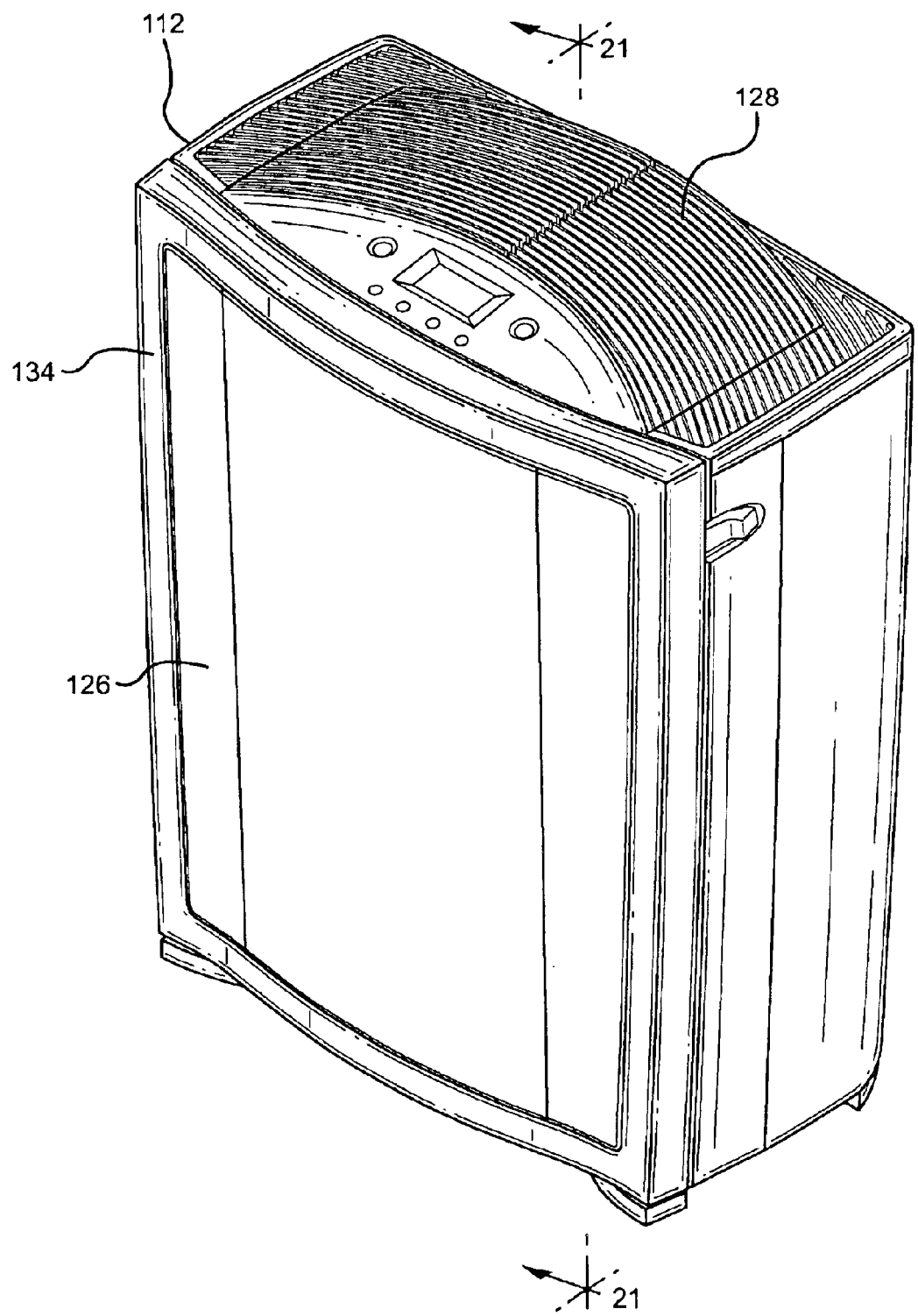
FIG. 19 is a front perspective view of a fourth member of a family of air purifiers in accordance with the present invention.
Figure 20:
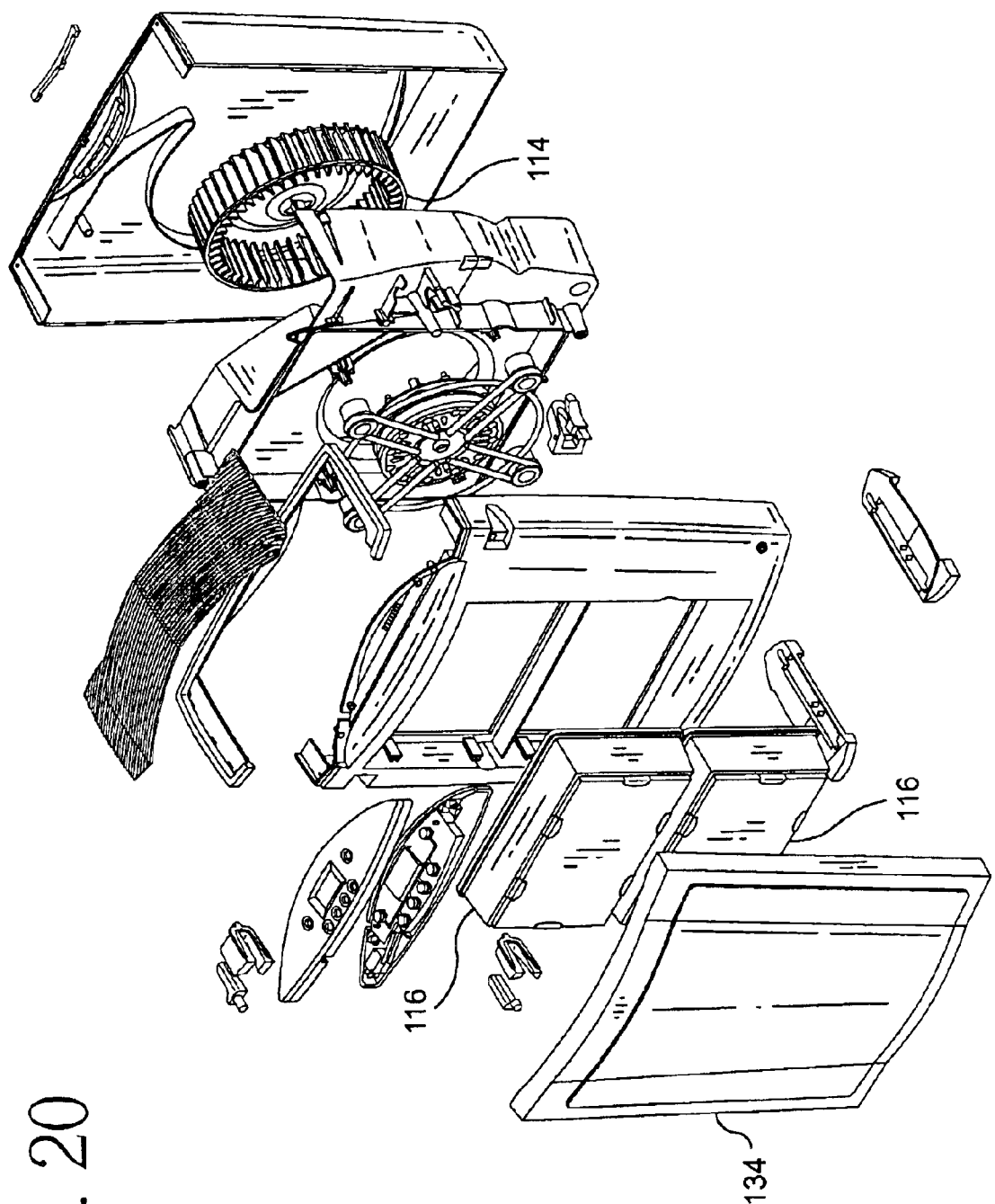
FIG. 20 is an exploded perspective view of the air purifier shown in FIG. 19.
Figure 21:
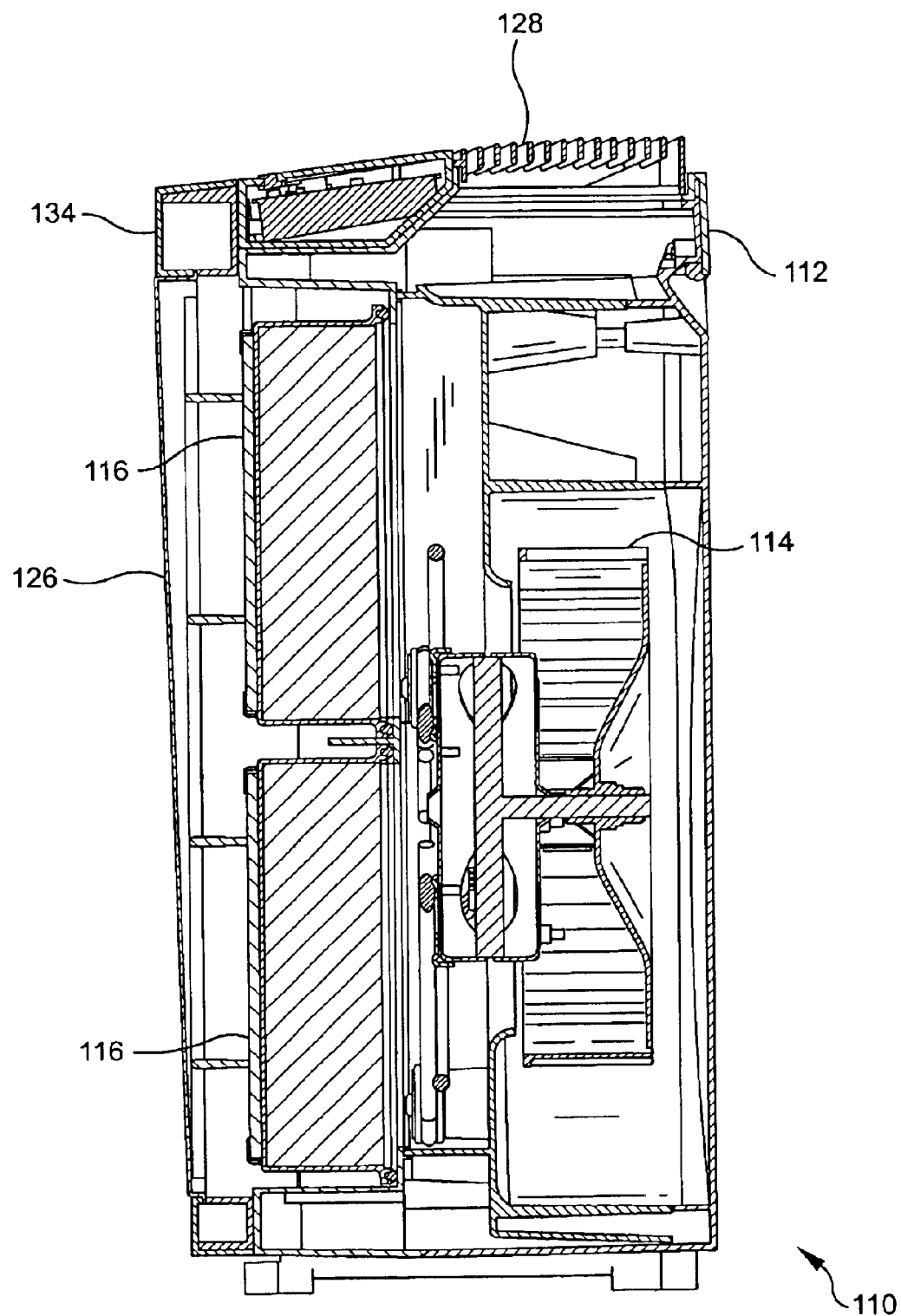
FIG. 21 is a cross-sectional view taken along line 21—21 as shown in FIG. 19.
Figure 22:
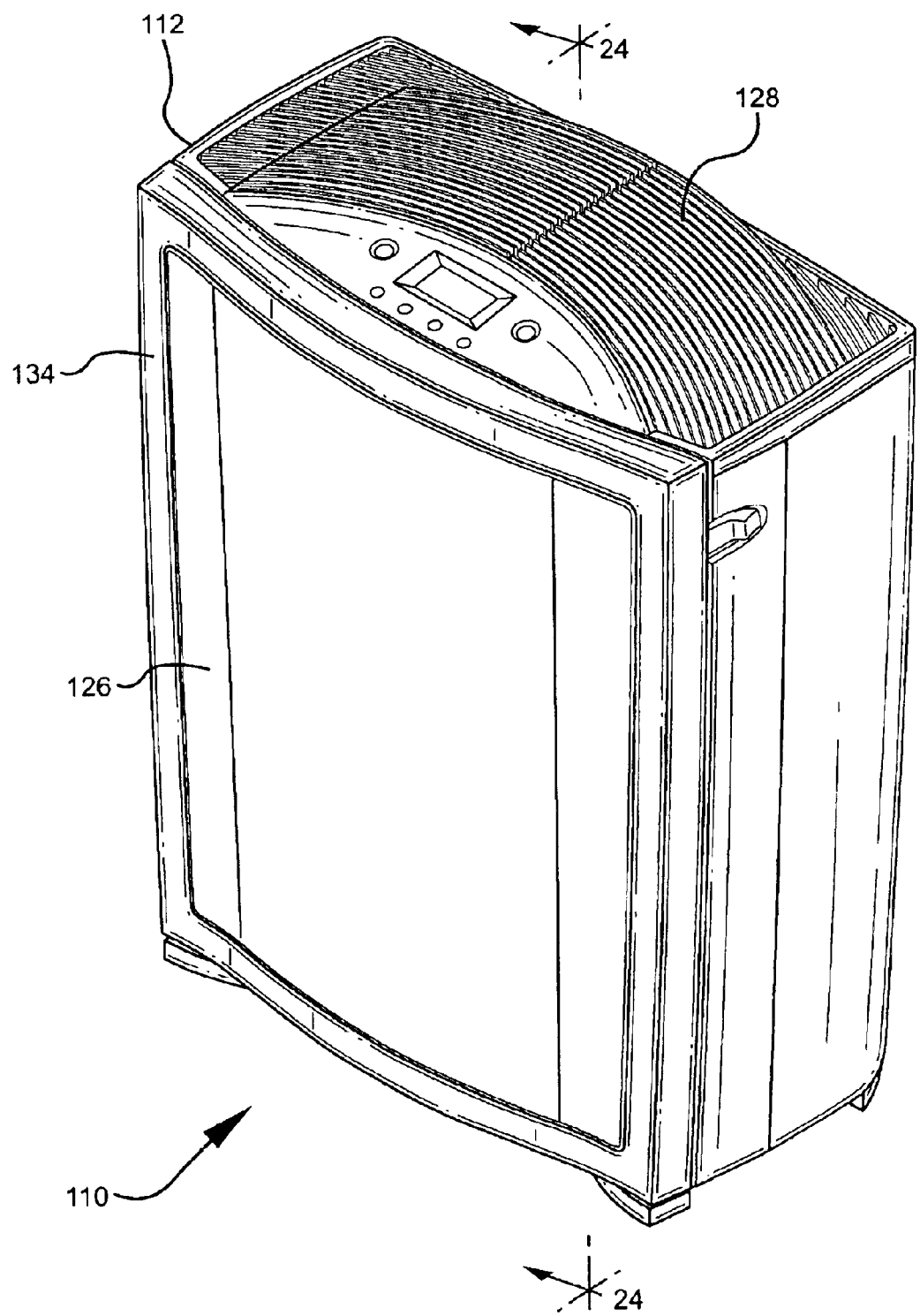
FIG. 22 is a front perspective view of a fifth member of a family of air purifiers in accordance with the present invention.
Figure 23:
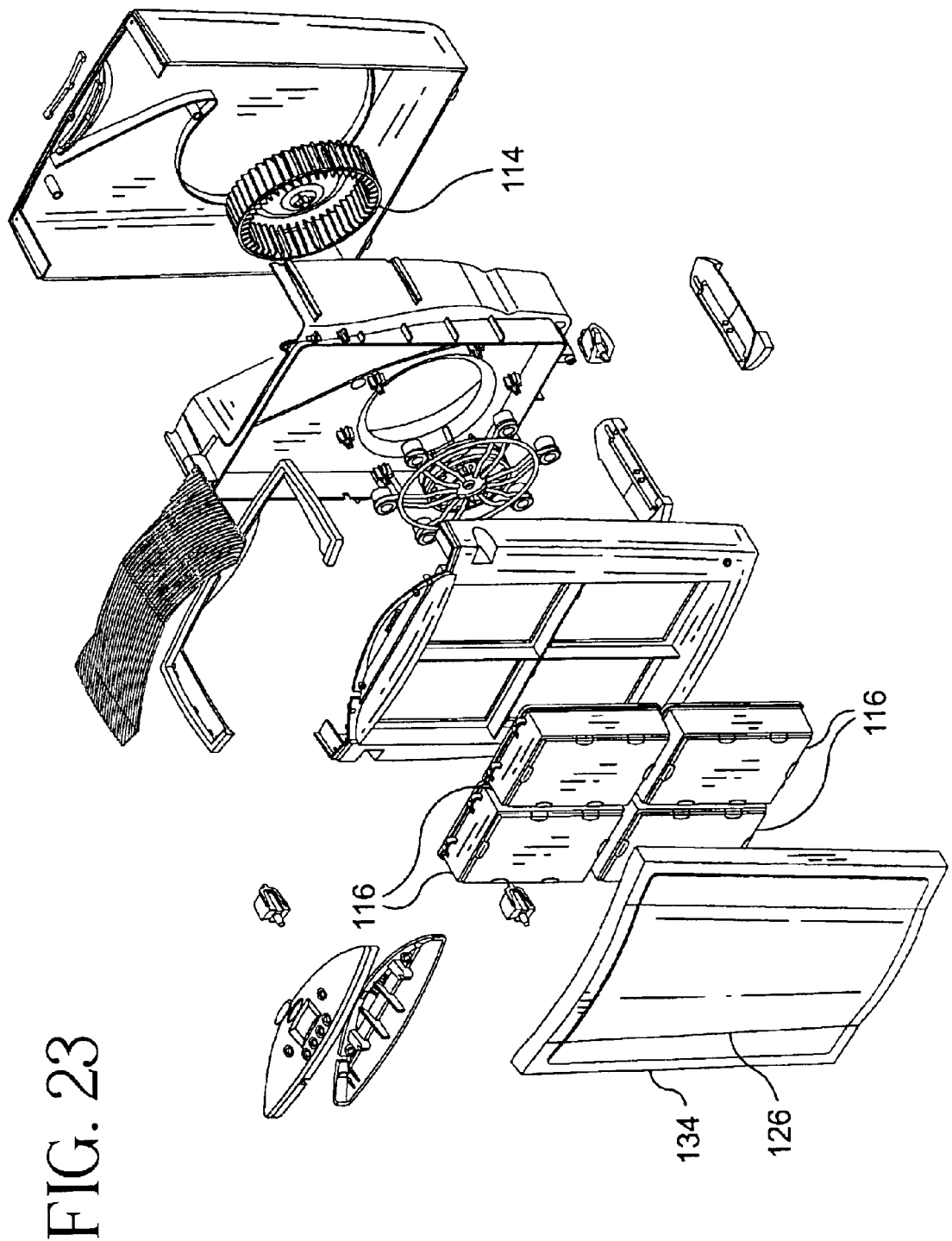
FIG. 23 is an exploded perspective view of the air purifier shown in FIG. 22.
Figure 24:
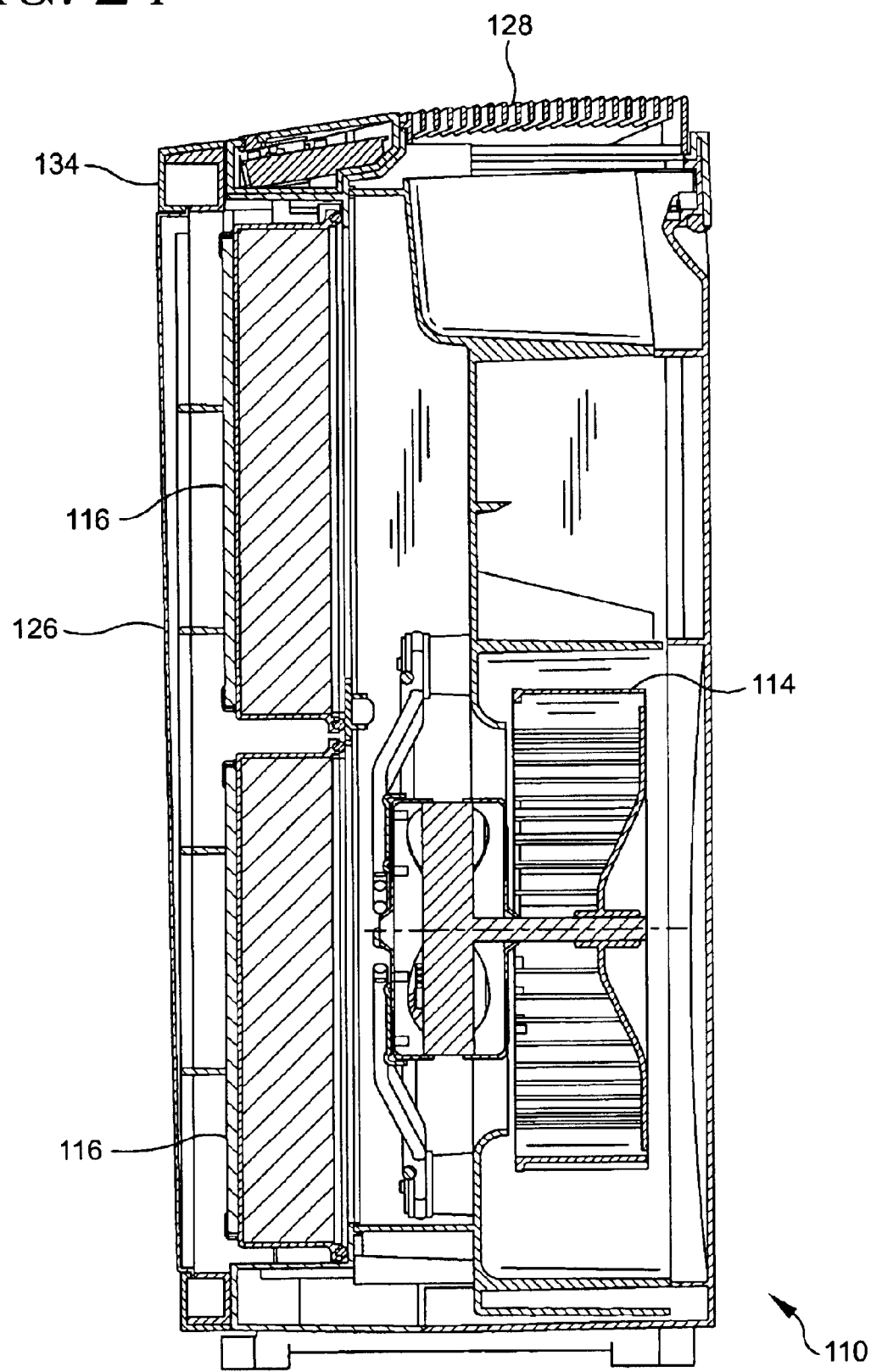
FIG. 24 is a cross-sectional view taken along line 24—24 as shown in FIG. 22.

All of the purifiers 110 shown in FIGS. 10, 13, 16, 19, and 22 are configured to use the same filter assembly 116 that is detailed in FIGS. 25 through 31. As illustrated in the exploded views (see FIGS. 11, 14, 17, 20, and 23), the air purifying devices 110 use either 2, 3 or 4 filter assemblies 116. Although not shown, one skilled in the art would understand that an air purifier can be configured to use only 1 filter assembly 116 as evidenced by the embodiments shown in FIGS. 1 through 9. The exploded views also illustrate that the filter assemblies 116 can be either vertically hung (as shown in FIGS. 17 and 23), cantilevered—horizontally arranged—(as shown in FIGS. 11 and 20), or a combination of both vertically hanging and cantilevering (as shown in FIG. 14).

Figure 25:
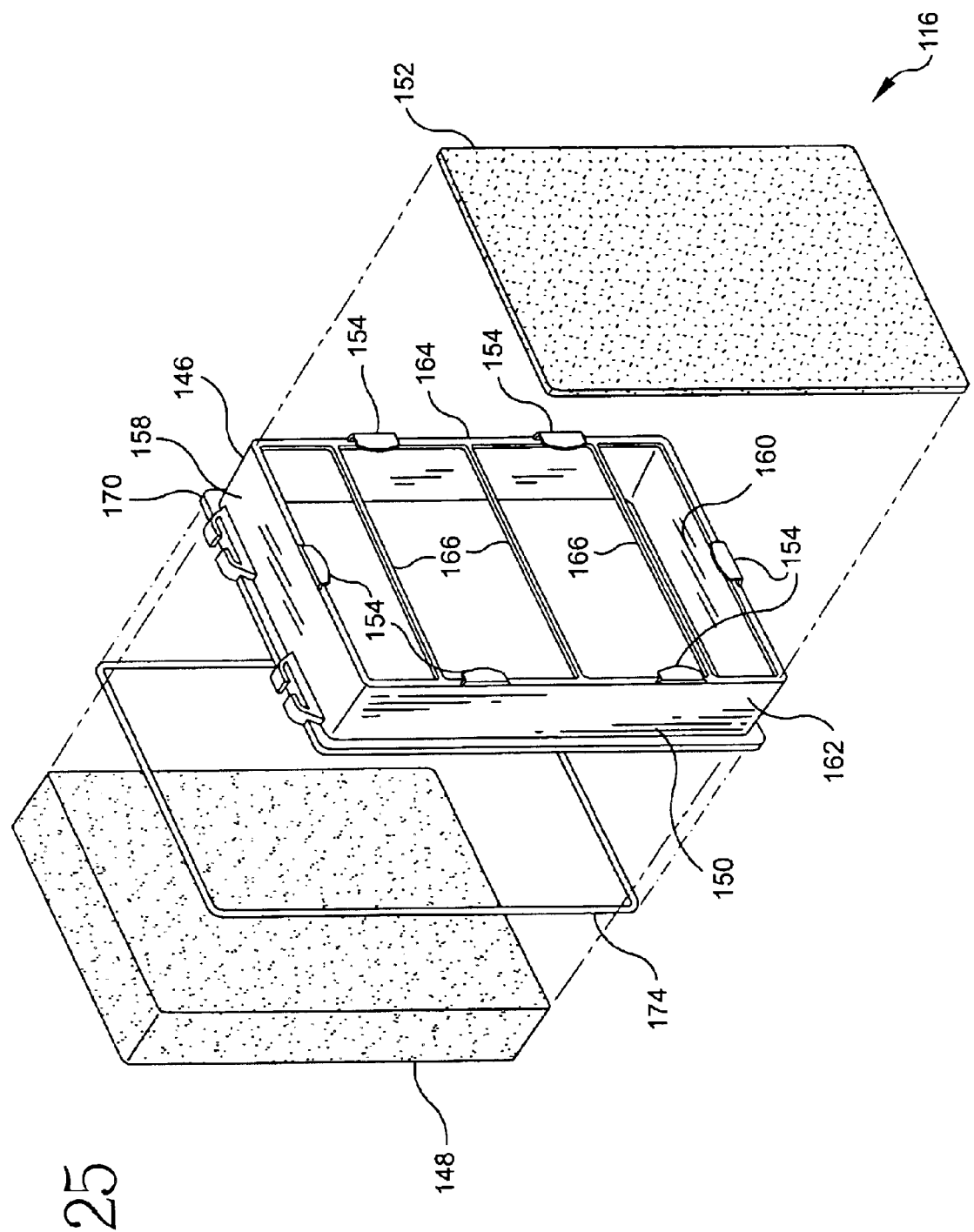
FIG. 25 is an exploded view of a filter assembly for the family of air purifiers shown in FIGS. 10 through 24.
Figure 28:
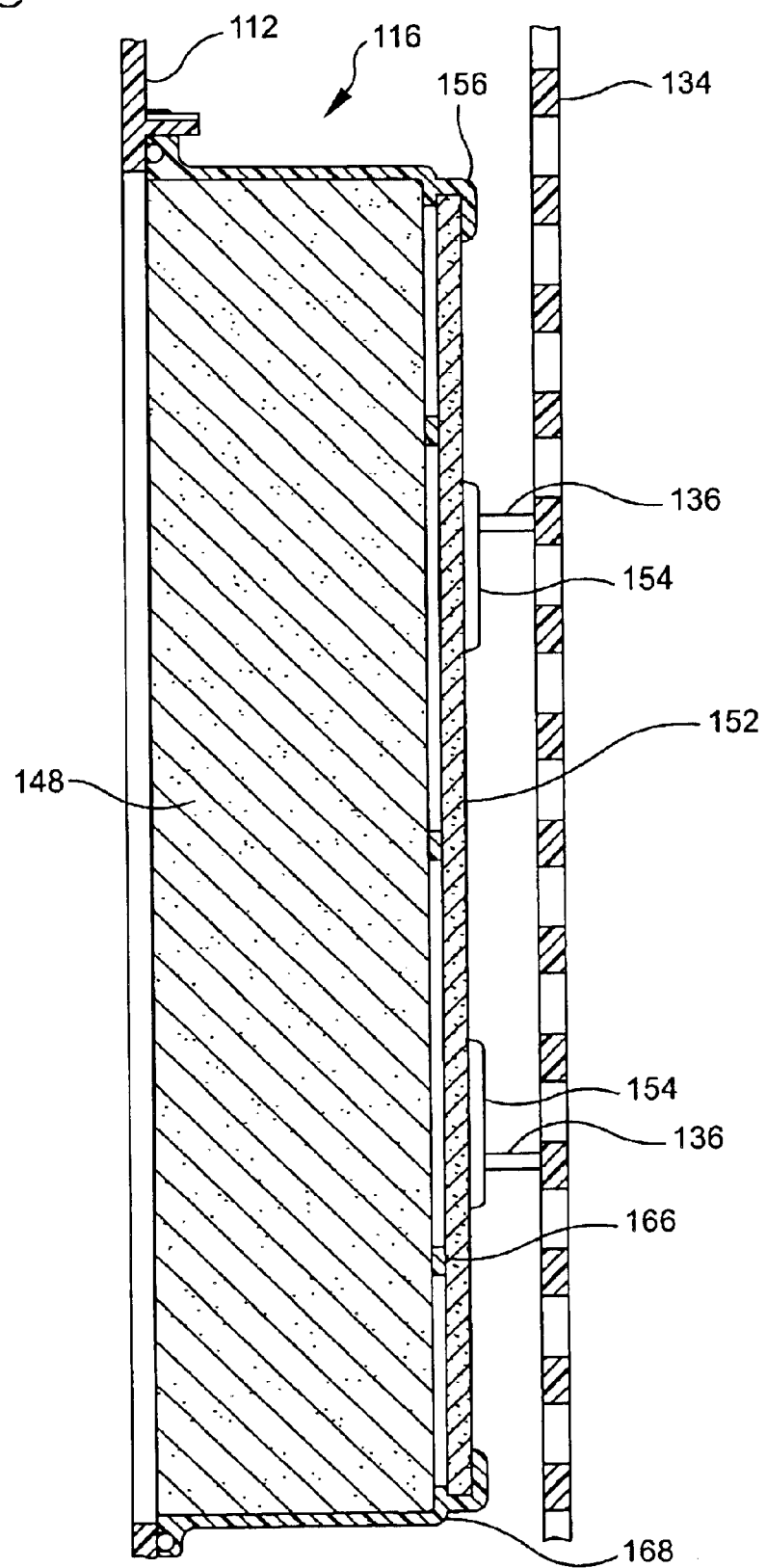
FIG. 28 is a cross-sectional view taken along line 28—28 as shown in FIG. 27.

Referring now to FIGS. 25 and 28, the filter assembly 116 includes a frame 146 and a first filter element 148 mounted within the frame 146 and preferably a second filter element 152 mounted on the intake side 168 of the filter assembly 116. Preferably the first filter element 148 is a HEPA filter for removing particulate matter and the second filter element 148 is a carbon filter 152 for removing odors. The second filter element 152 is preferably removably attached to the filter assembly 116 by a plurality of filter tabs 154.

The frame 146 of the filter assembly 116 has an exterior surface 150 and preferably includes a top wall 158, a bottom wall 160, and first and second opposing side walls 162, 164 connecting the top and bottom walls 158, 160 with the first filter element 148 being positioned within the walls. The frame 146 is generally rectangular, but could include other shape and sizes. Preferably the frame 146 includes straps 166 that extend between the first and second opposing side walls 162, 164. The frame 146 is preferably configured to receive a rubber gasket 174 to ensure a good seal against the housing. Preferably the frame 146 includes a lip 170 that extends around the perimeter of the frame 146 formed with a recess for receiving the gasket 174.

Figure 26:
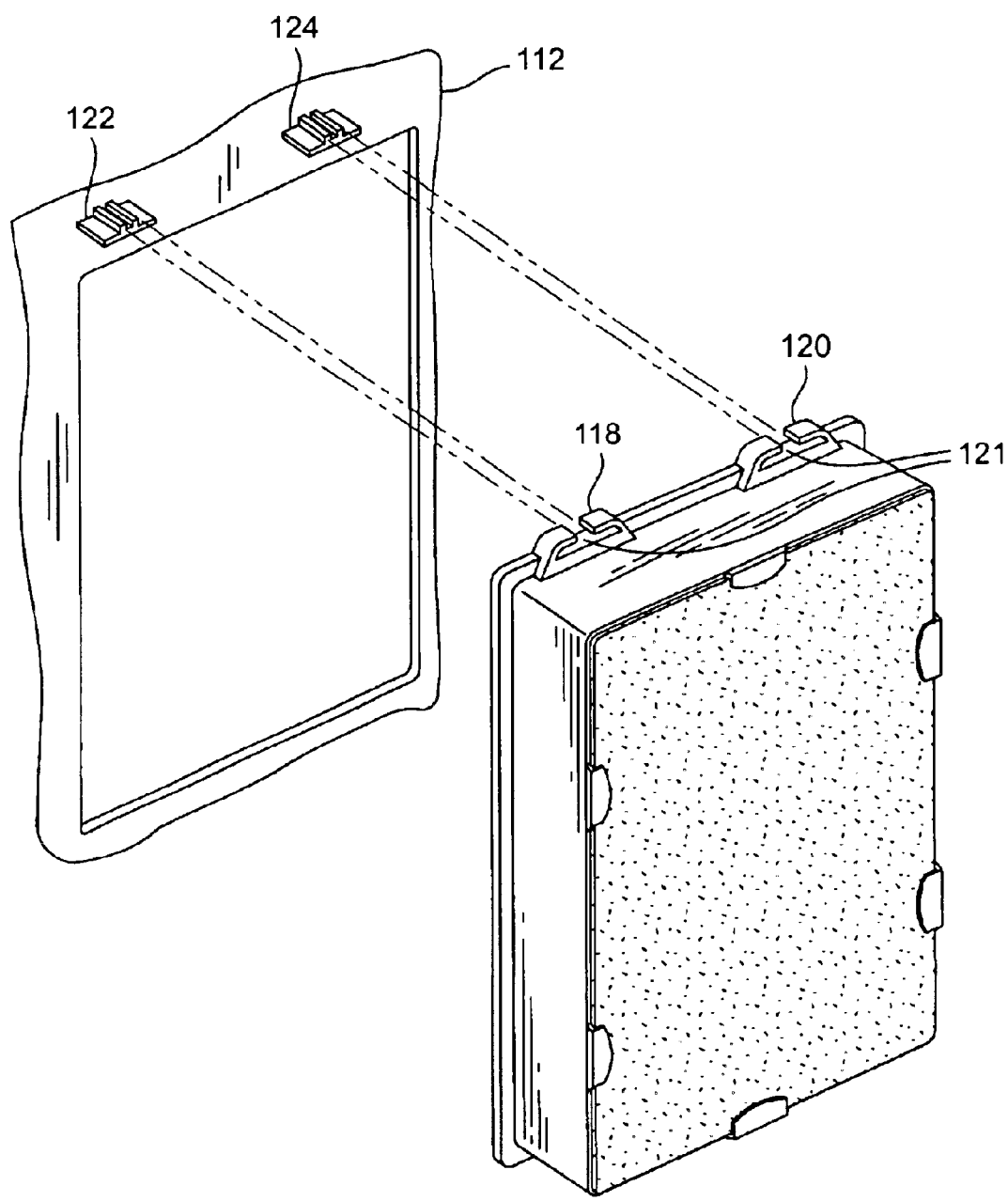
FIG. 26 is a partially exploded view showing the relation of the filter assembly to the housing.
Figure 29:
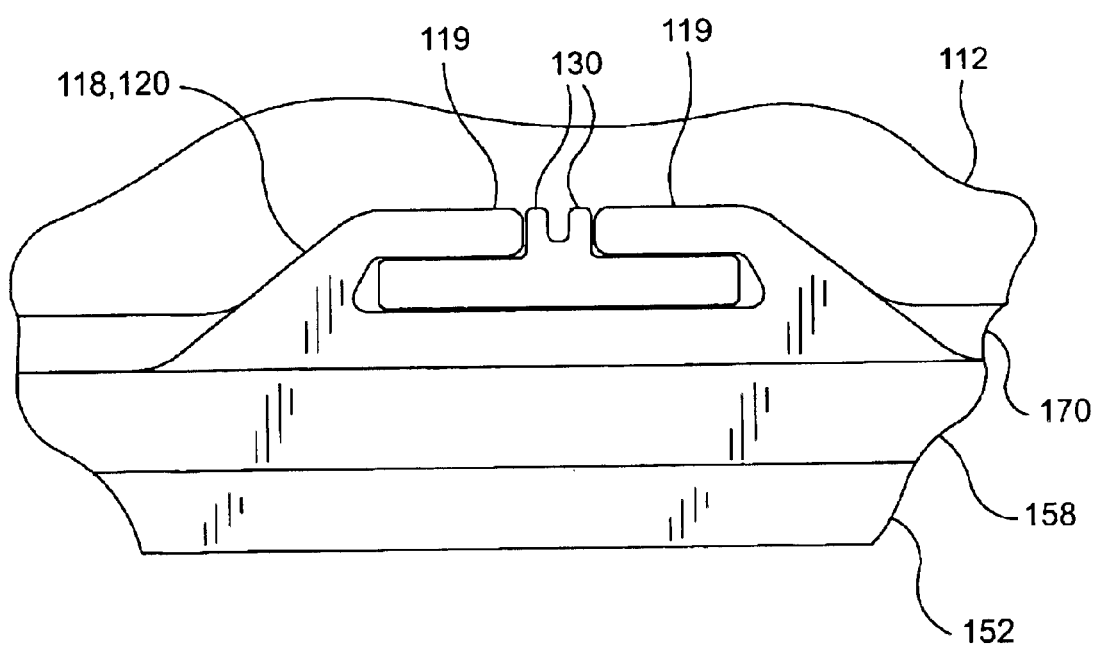
FIG. 29 is a partial elevational view showing the connection of the filter assembly to the housing as shown in FIG. 27.
Figure 31:
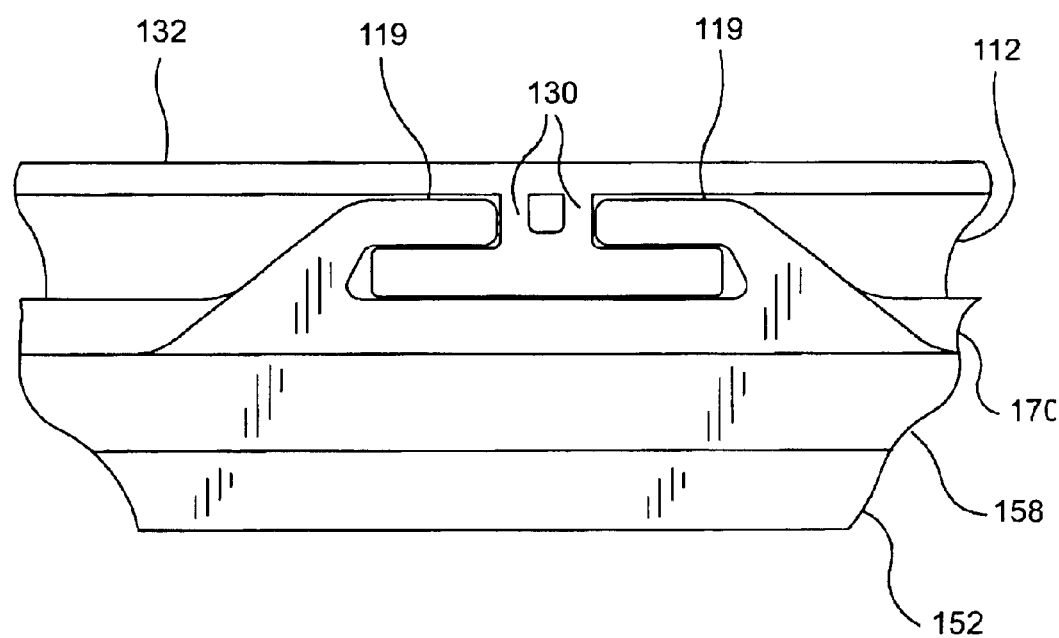
FIG. 31 is a view similar to FIG. 29 of the housing shown in FIG. 30.

The filter assembly 146 also includes at least one hanger for facilitating the connection to an elongate hanger support. As shown in FIG. 26, preferably the filter assembly includes first and second hangers 118, 120. Each hanger 118, 120 preferably includes a pair of legs 119 attached to the top wall 158 at the lip 170 to form an open "C" shaped section. This arrangement defines a gap 121 between the legs 119. When the filter assembly 146 is mounted to the housing 112 as shown in FIGS. 29 and 31 each leg 119 engages a portion of the respective elongate hanger support 122, 124.

Figure 8:
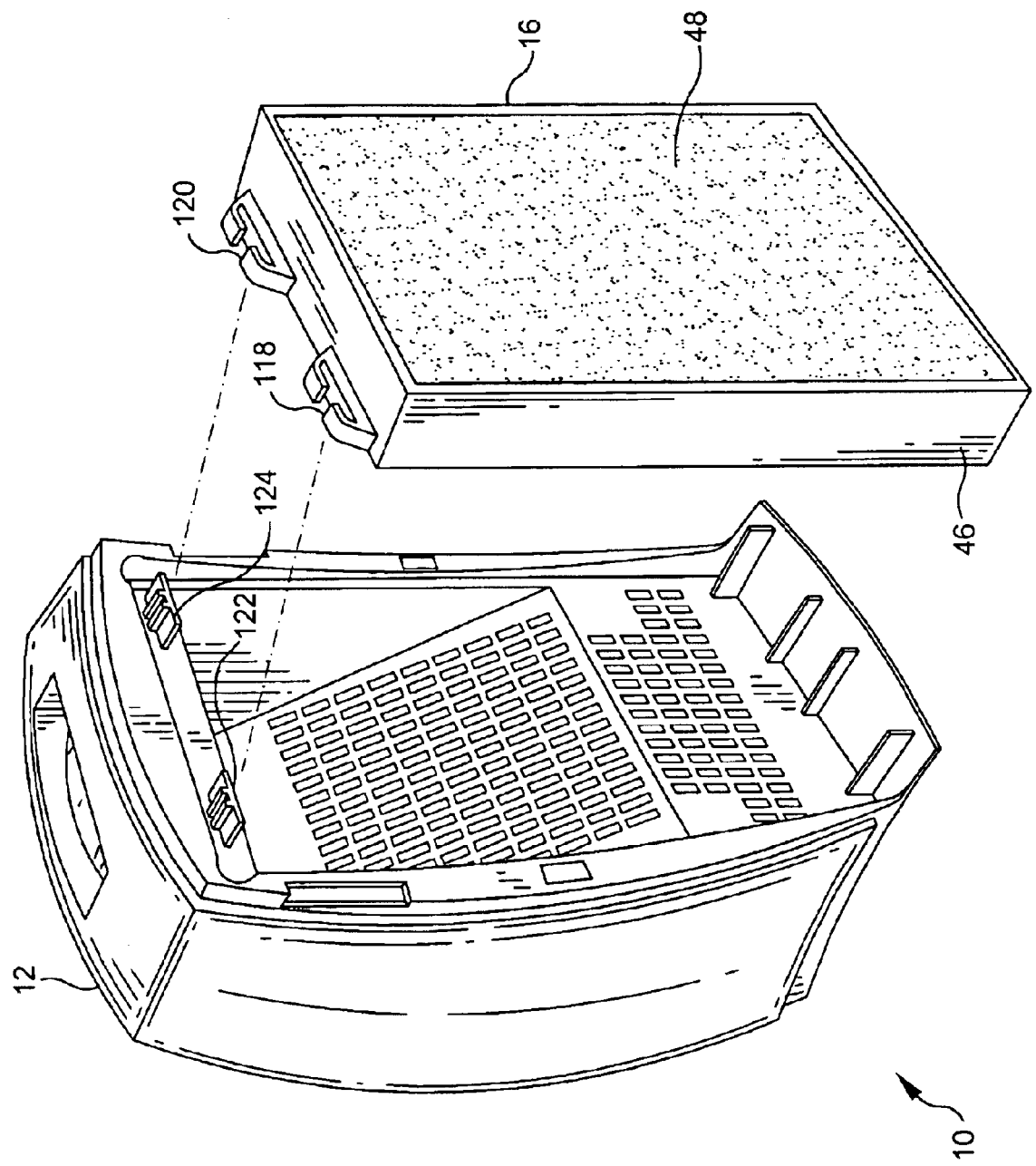
FIG. 8 is a partially exploded rear perspective view of another alternative embodiment of the present invention that include the hangers and elongate hanger supports shown in FIGS. 26 and 29.
Figure 9:
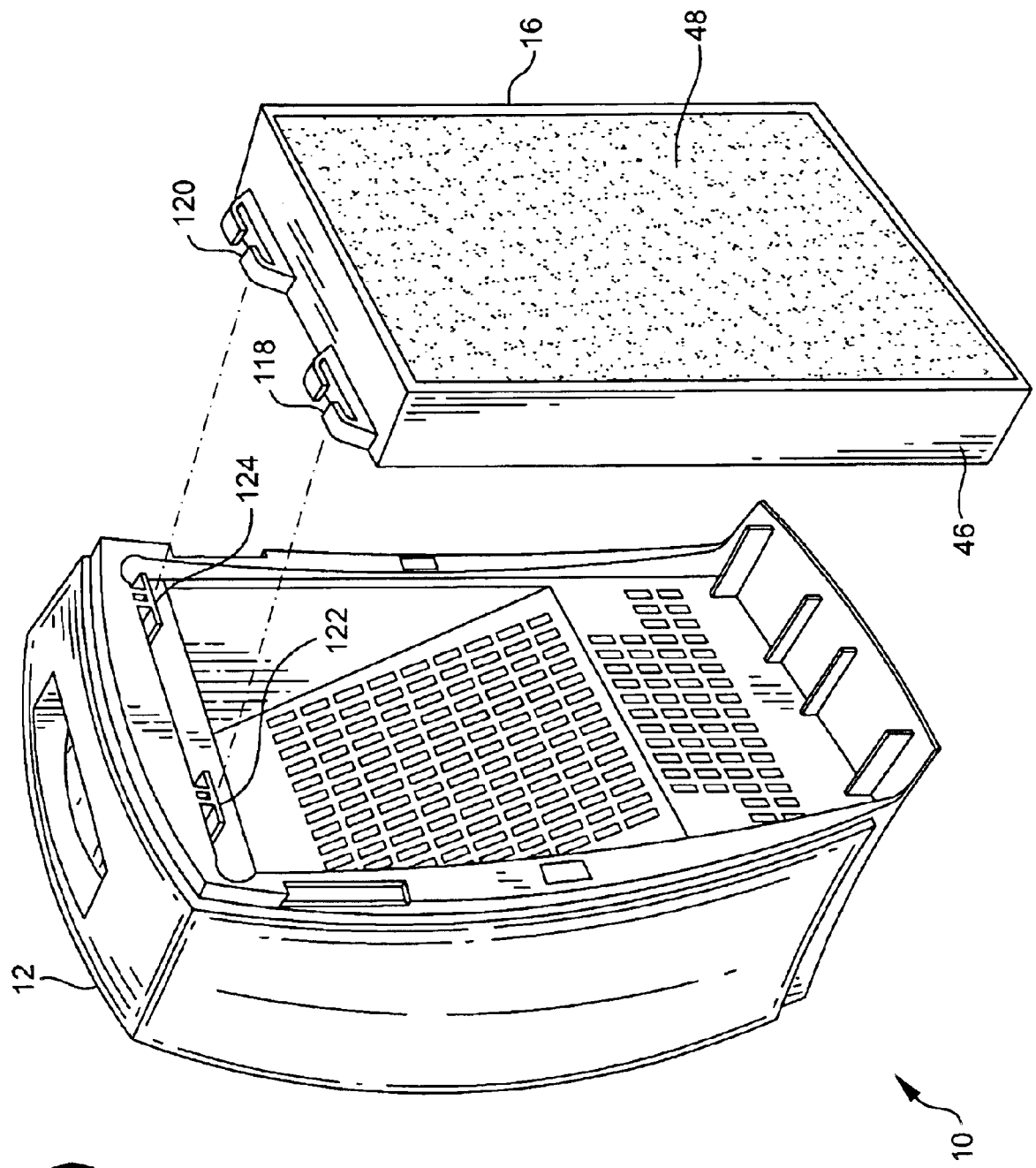
FIG. 9 is a partially exploded rear view of another alternative embodiment of the present invention that includes the hanger and elongate hanger supports shown in FIGS. 30 and 31.
Figure 10:
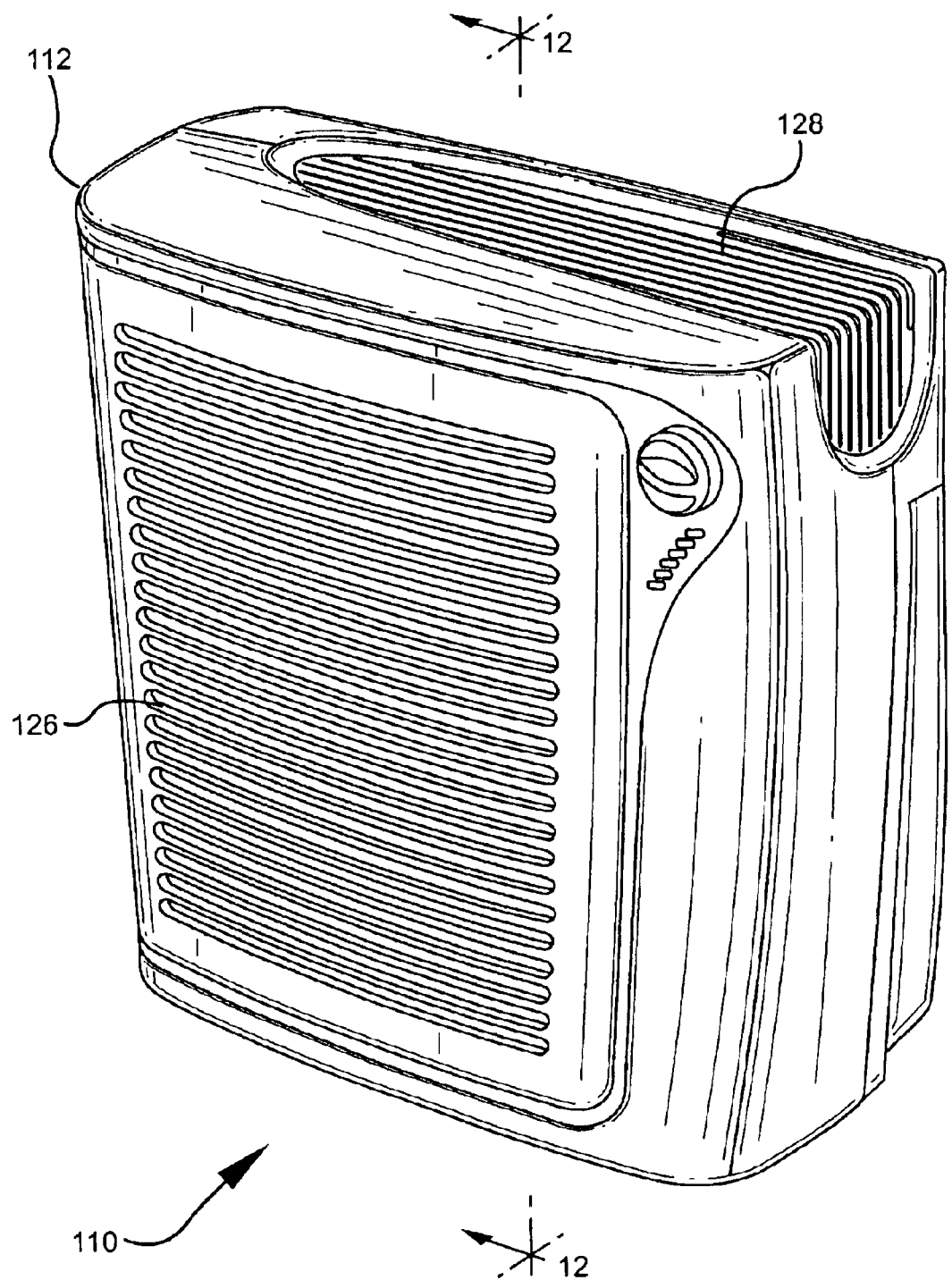
FIG. 10 is a front perspective view of a first member of a family of air purifiers in accordance with the present invention.
Figure 30:
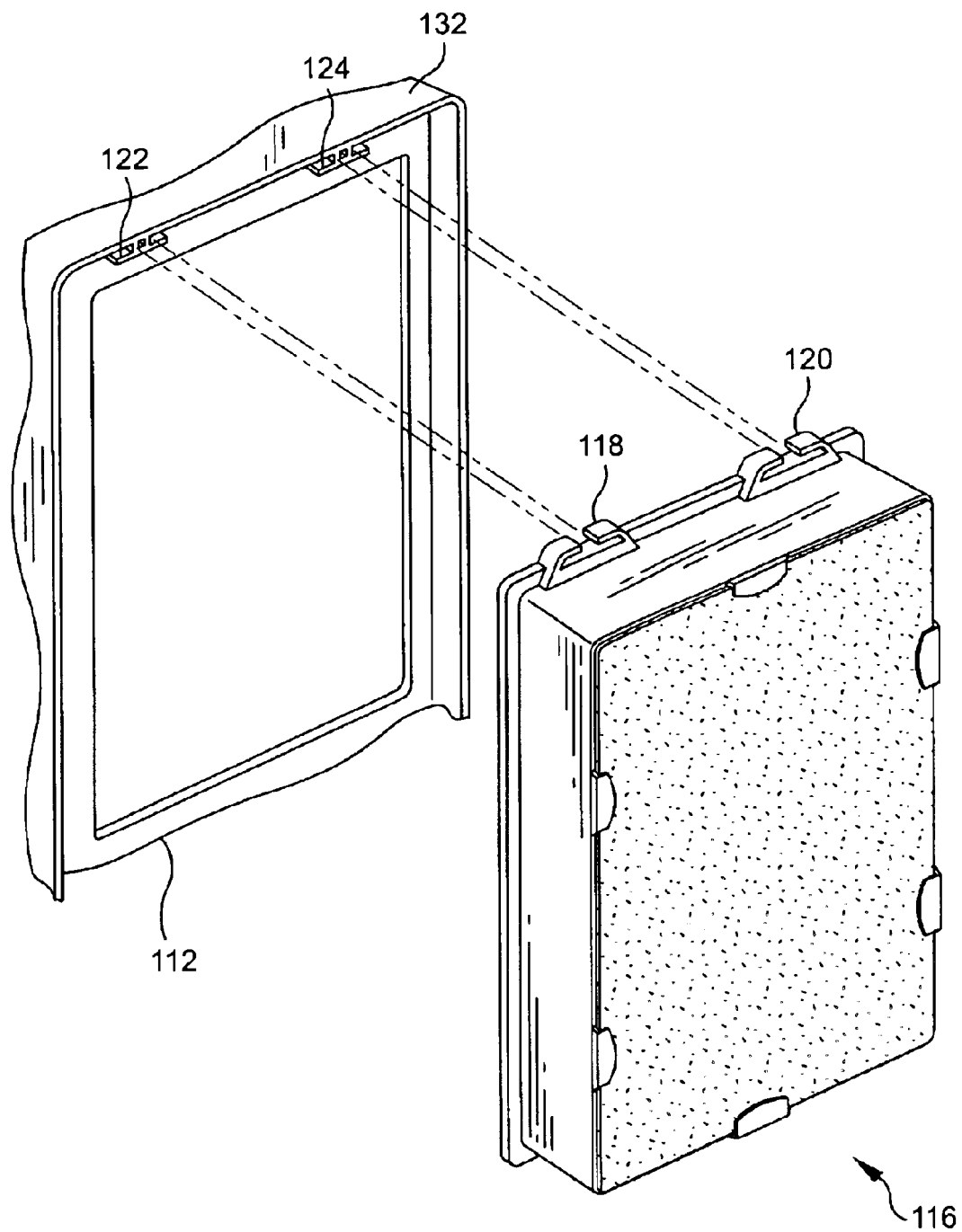
FIG. 30 is similar to FIG. 26 but illustrates an alternative configuration of the housing.

Referring now to FIG. 26, the elongate hanger supports 122, 124 are attached at one end to the housing 112 as a cantilever. To complement the configuration of the hangers 118, 120, preferably the elongate hanger supports 122, 124 include at least one rib 130 extending between the gap, and most preferably a pair of ribs 130 that are arranged to contact the legs of the hanger 118, 120 when the filter assembly 116 is installed thereon as shown in FIG. 29. The ribs 130 help stiffen the elongate member 122, 124 against bending and reduce the rotation of the filter assembly 116 when the filter assembly 116 is cantilevered—horizontally arranged—as shown in FIGS. 11 and 20. In an alternative embodiment, the housing 112 includes a wall element 132 that is attached to the ribs 130 and runs substantially perpendicular thereto as shown in FIGS. 30 and 31. FIGS. 8 and 9 illustrate another embodiment of the present invention that includes the housing 12 and filter assembly 16 of the embodiment shown in FIGS. 1 through 5 while utilizing the hangers 118, 120 and hanger supports 122, 124 as detailed in FIGS. 29 and 31.

Figure 15:
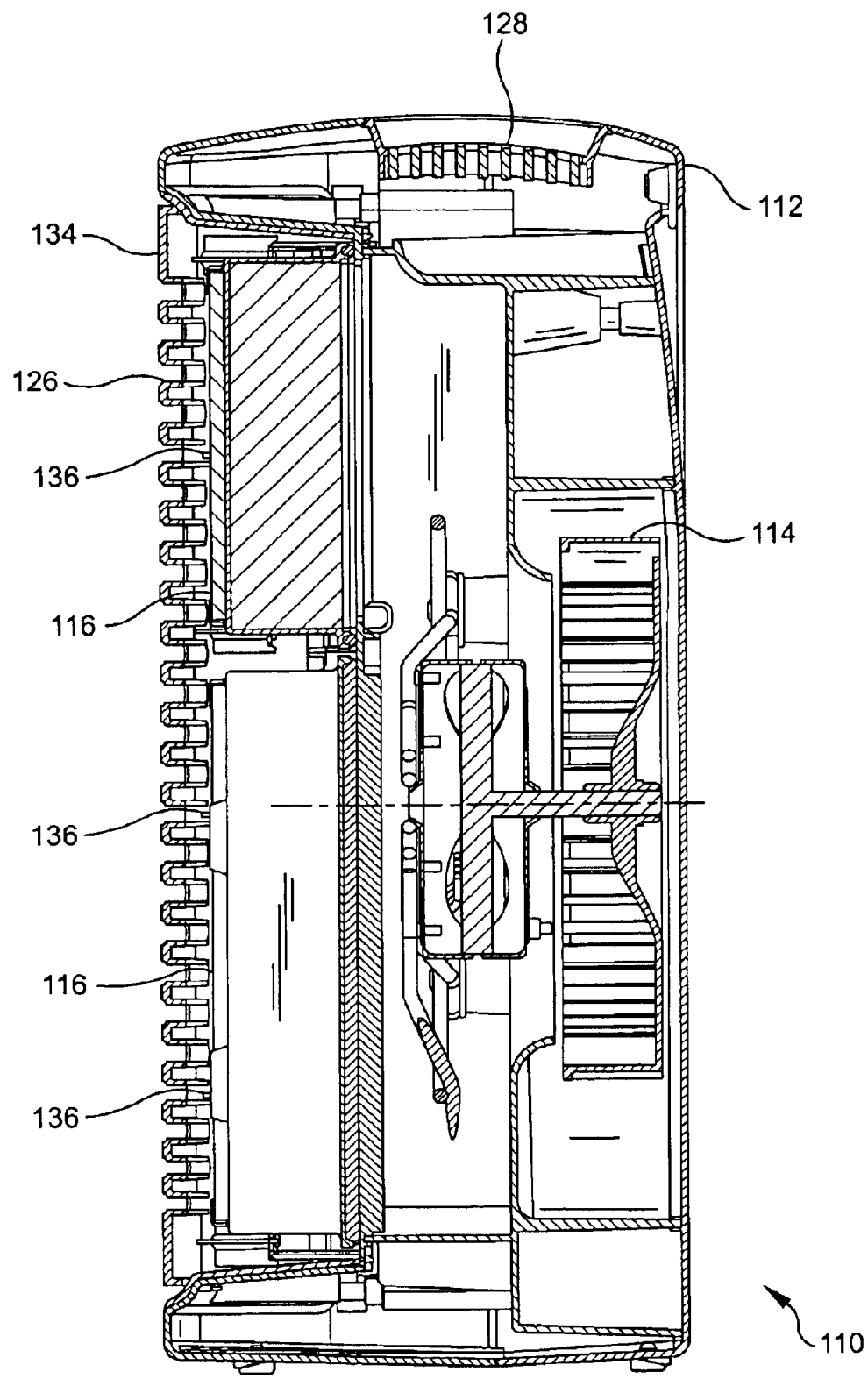
FIG. 15 is a cross-sectional view taken along line 15—15 as shown in FIG. 13.
Figure 16:
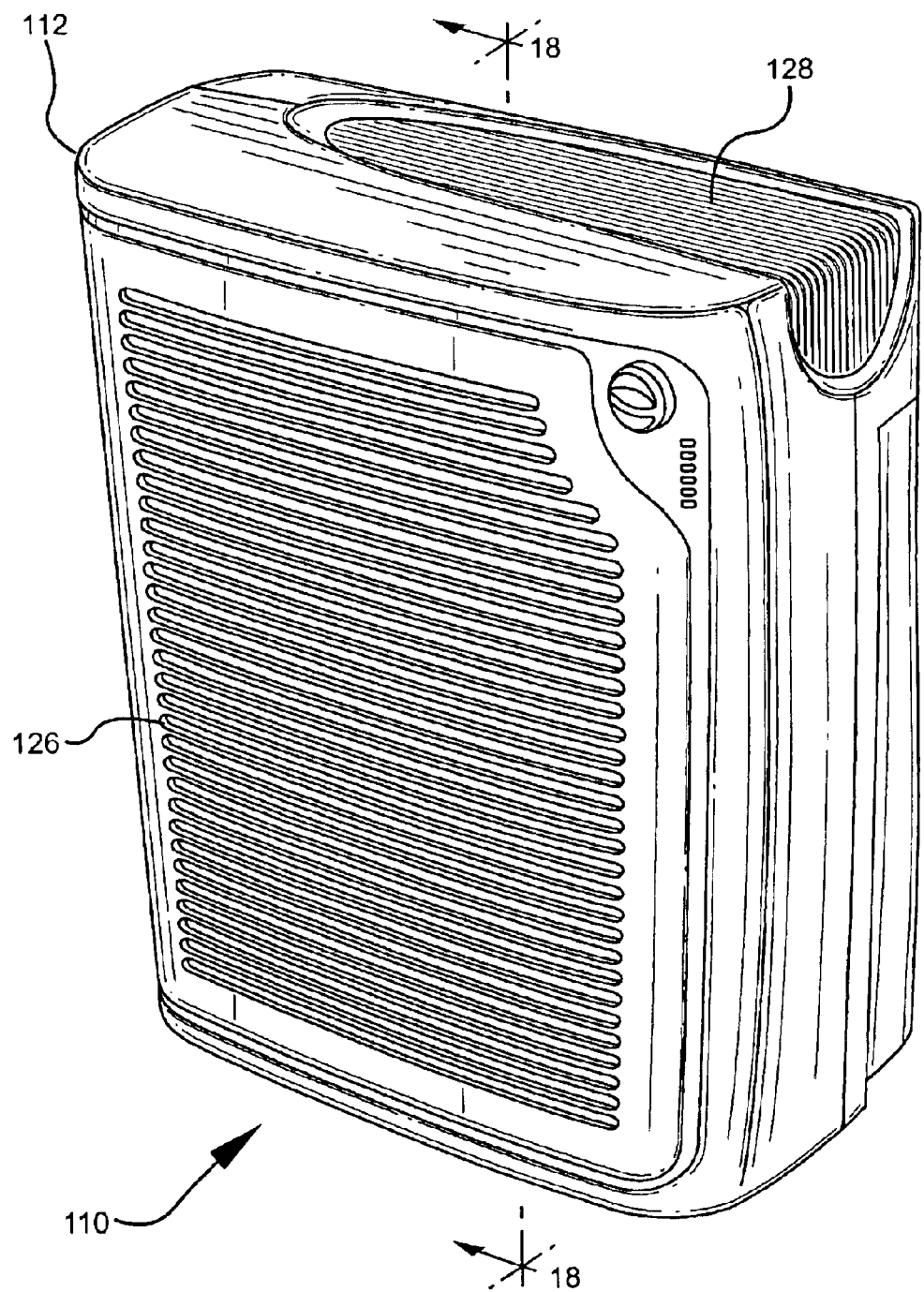
FIG. 16 is a front perspective view of a third member of a family of air purifiers in accordance with the present invention.
Figure 27:
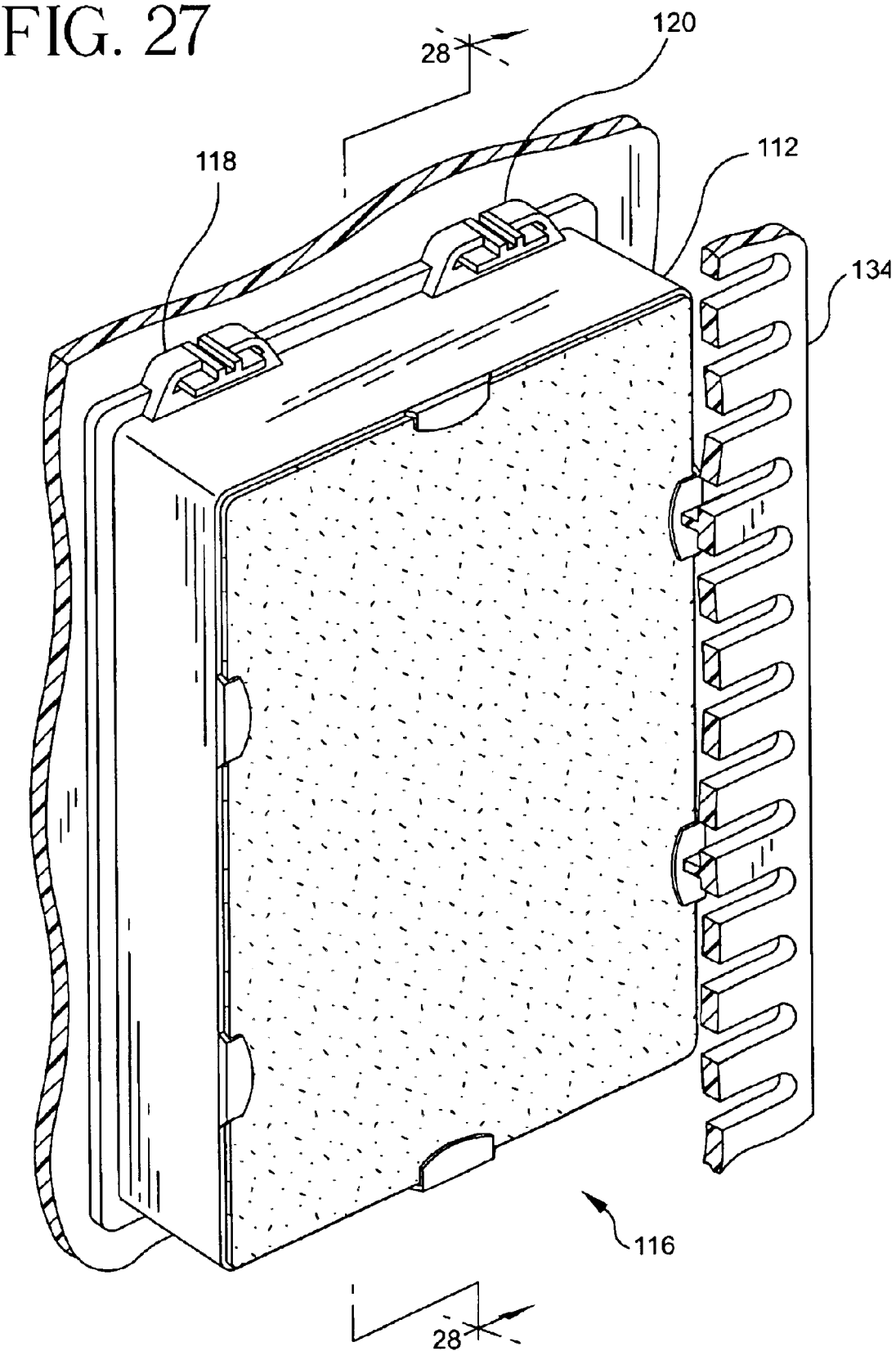
FIG. 27 is a perspective view showing the filter assembly mounted to the housing inside the door.

Referring again to FIGS. 10 through 24, the air purifiers 110 preferably include a door 134 for gaining access to the filter assemblies 116. Referring now to FIG. 27, the filter assembly 116 is shown positioned within the housing 12 with respect to the door 134. Preferably the door 134 includes door tabs 136 that are configured to make contact with the filter tabs 154 that secure the second filter element 152 to the filter assembly 116. The contact helps ensure that a good seal is maintained between the gasket 174 and housing 112. The door tabs 136 can be arranged to make contact with the filter tabs 154 in a variety of ways as shown in FIG. 27 and FIG. 15. Preferably the door tabs 136 are arranged to span the filter assembly 116 in a horizontal manner. That is, where the filter assembly 116 is hung vertically as shown in FIG. 27 preferably at least one pair of door tabs 136 makes contact with the filter tabs 154 on opposite side walls 162, 164. Where the filter assembly 116 is cantilevered as represented by the top filter assembly 116 in FIG. 15 preferably at least one pair of door tabs 136 makes contact with the filter tabs 154 on the top and bottom walls 158, 160.

The family of air purifiers 110 formed in accordance with the present invention solves a huge problem with retailers that market air purifiers. The family of air purifiers 110 includes a variety of members designed to have different Clean Air Delivery Rates ("CADR") to suit consumers particular performance requirements. The filter assembly disclosed herein can be used in all the members' housings. This allows retailers to stock a single filter assembly 116 to suit the demands of all consumers. This benefits the retailer because the filter assemblies will turn over more frequently and the retailer does not have to allocate as much shelf space as is needed to stock a variety of different size units.

In addition, the filter assembly 116 also provides advantages in reducing shelf space by having the hangers formed as an open "C" shaped section that defines the gap 121. The hanger 118, 120 could have been designed as illustrated by the embodiment shown in FIGS. 1 through 5 without a gap 121, but it was found that the gap allows for the packaging size for the replacement filter assemblies 116 to be reduced if the ribs 130 of the elongate members 122, 124 are allowed to extend between the legs 119 of each hanger 118, 120.

Although illustrative embodiments of the present invention have been described herein with reference to the accompanying drawings, it is to be understood that the invention is not limited to those precise embodiments, and that various other changes and modifications may be effected by one skilled in the art without departing from the scope or spirit of the invention.

What is claimed is:

1. A filter assembly for removable mounting to an air purifying device, comprising:
    a frame including a top wall, a bottom wall, and first and second opposing side walls connecting said top and bottom walls;
    a filter element mounted within said walls of said frame, and
    an elongate hanger support coupled to said frame and configured to extend within a hanger mounted to the air purifying device, the hanger having a channel and at least one pair of converging walls bounding the channel, said elongate hanger support being configured to frictionally engage the pair of converging walls.

2. A filter assembly as described in claim 1, wherein said elongate hanger support is coupled to said top wall.

3. A filter assembly as described in claim 1, wherein said elongate hanger support is coupled to one of said first side wall and said second side wall.

4. A device as described in claim 1, wherein said elongate hanger support is coupled to an exterior surface of said frame.

5. A device as described in claim 4, wherein said elongate hanger support is coupled to a top surface of said frame.

6. A device as described in claim 4, wherein said frame includes first and second side surfaces, said elongate hanger support is coupled to one of said first side surface and said second side surface.

* * * * *